(12) United States Patent
Iijima et al.

(10) Patent No.: US 10,257,391 B2
(45) Date of Patent: Apr. 9, 2019

(54) INFORMATION PROCESSING APPARATUS AND INFORMATION PROCESSING METHOD

(71) Applicant: Oki Data Corporation, Tokyo (JP)

(72) Inventors: Osamu Iijima, Tokyo (JP); Noriharu Fujiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/874,332

(22) Filed: Jan. 18, 2018

(65) Prior Publication Data

US 2018/0213123 A1 Jul. 26, 2018

(30) Foreign Application Priority Data

Jan. 26, 2017 (JP) ................................ 2017-012107

(51) Int. Cl.
- *G06K 15/00* (2006.01)
- *H04N 1/44* (2006.01)
- *H04N 1/00* (2006.01)

(52) U.S. Cl.
CPC ....... *H04N 1/4433* (2013.01); *H04N 1/00307* (2013.01); *H04N 1/00315* (2013.01); *H04N 1/4413* (2013.01); *H04N 2201/0039* (2013.01); *H04N 2201/0094* (2013.01)

(58) Field of Classification Search
CPC ............. H04N 1/4433; H04N 1/00307; H04N 1/00315; H04N 1/4413; H04N 2201/0039; H04N 2201/0094

USPC ........................................................ 358/1.14
See application file for complete search history.

(56) References Cited

U.S. PATENT DOCUMENTS

2002/0055922 A1* 5/2002 Minowa ............ G06F 17/30011
2014/0362401 A1* 12/2014 Yamashita ......... H04N 1/00503
                                                                358/1.15

FOREIGN PATENT DOCUMENTS

JP          2009-104263 A       5/2009

OTHER PUBLICATIONS

Kobayashi, JP 2015-118437, Image Forming System, Jun. 25, 2015, Oki Data Corp. (Year: 2015).*

* cited by examiner

*Primary Examiner* — Neil R McLean
(74) *Attorney, Agent, or Firm* — Muncy, Geissler, Olds & Lowe, P.C.

(57) ABSTRACT

An information processing apparatus connecting a terminal apparatus through a network includes a display unit that displays first explanatory information of the terminal apparatus, an input unit that receives a user operation input by a user, a first acquisition unit that, when the display unit displays the first explanatory information, based on a first instruction from the input unit, acquires a first identifier corresponding to the first explanatory information displayed by the display unit, the first instruction being one type of the user operation, and a first communication unit that transmits the first identifier acquired by the first acquisition unit to the terminal apparatus.

15 Claims, 29 Drawing Sheets

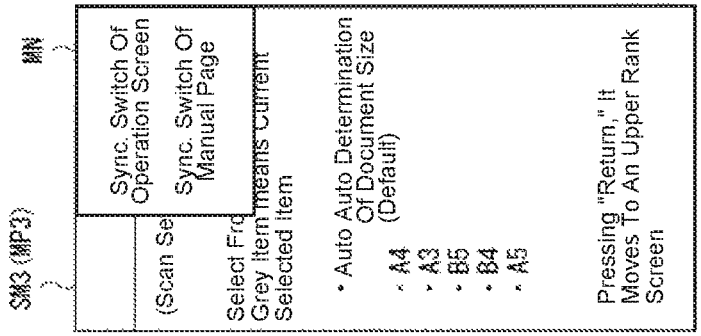
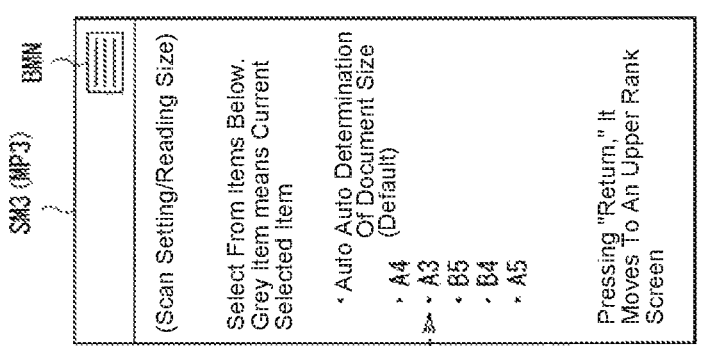
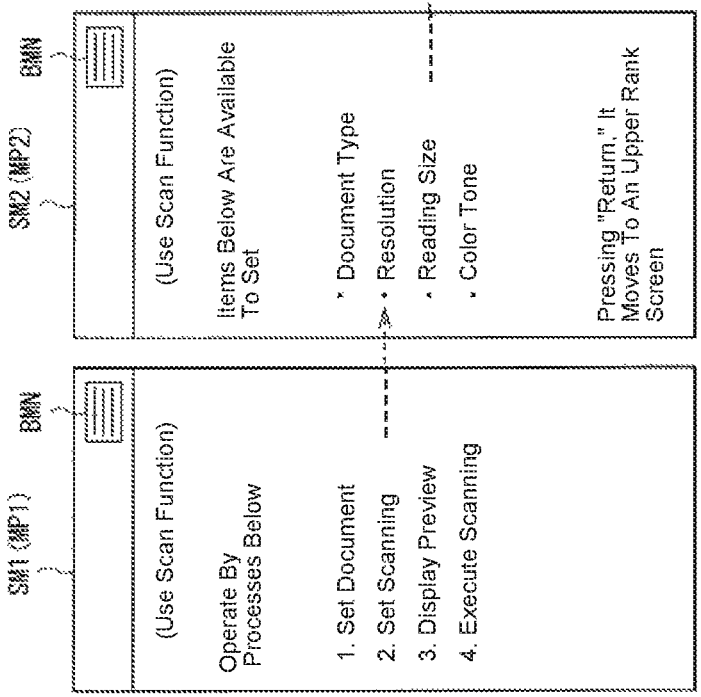

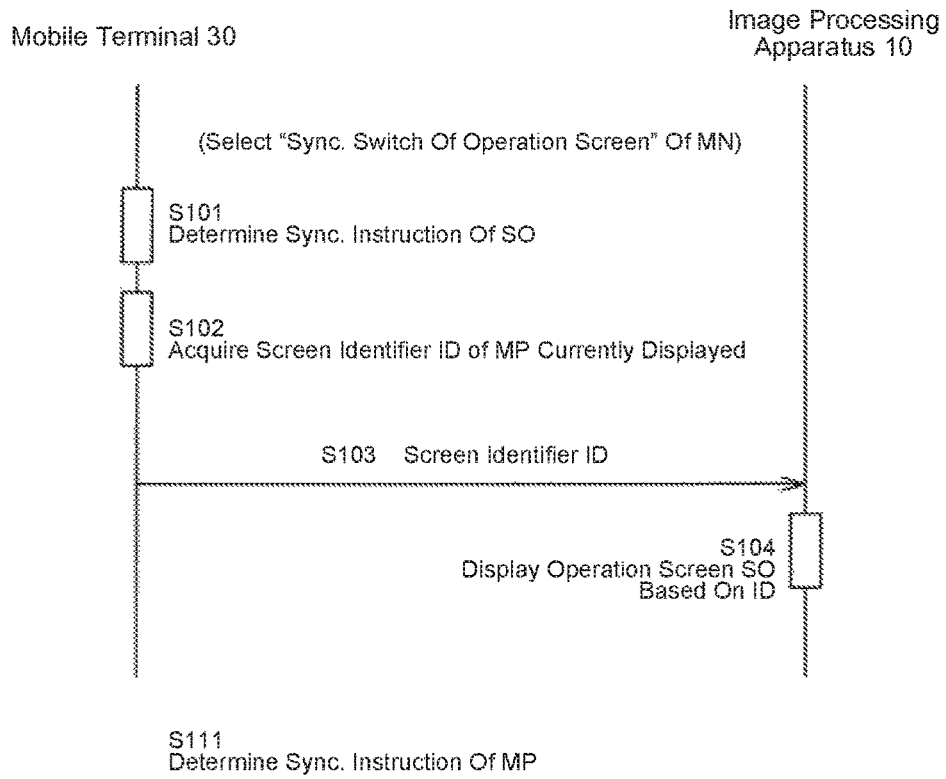
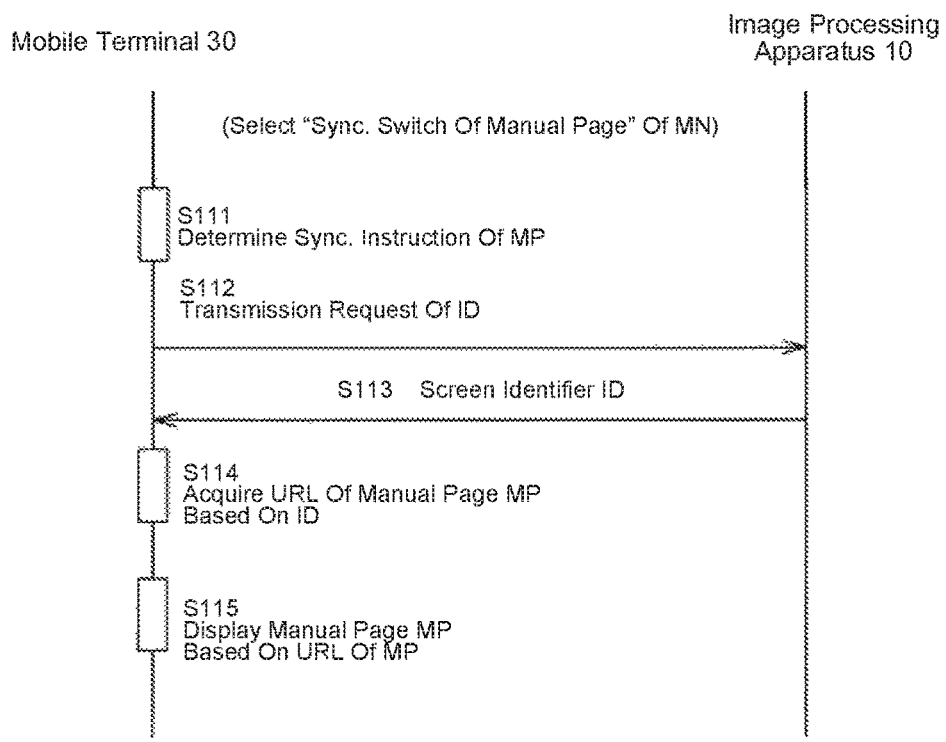

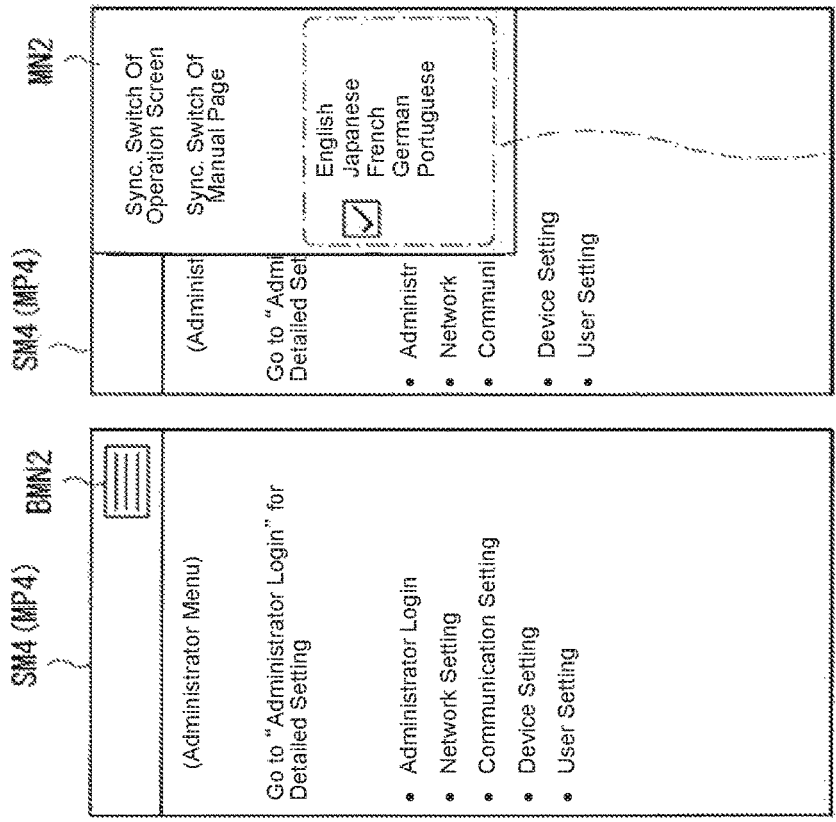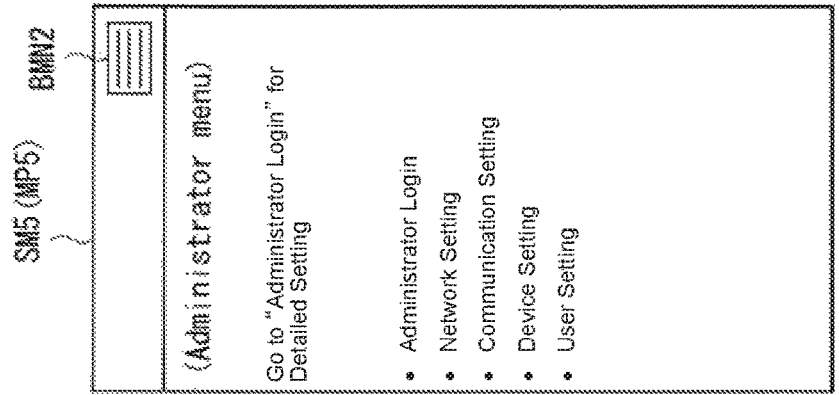

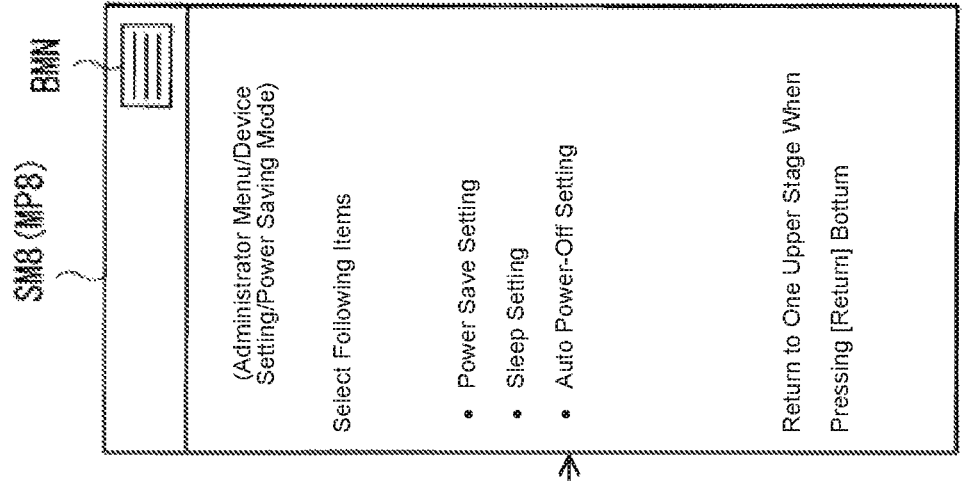
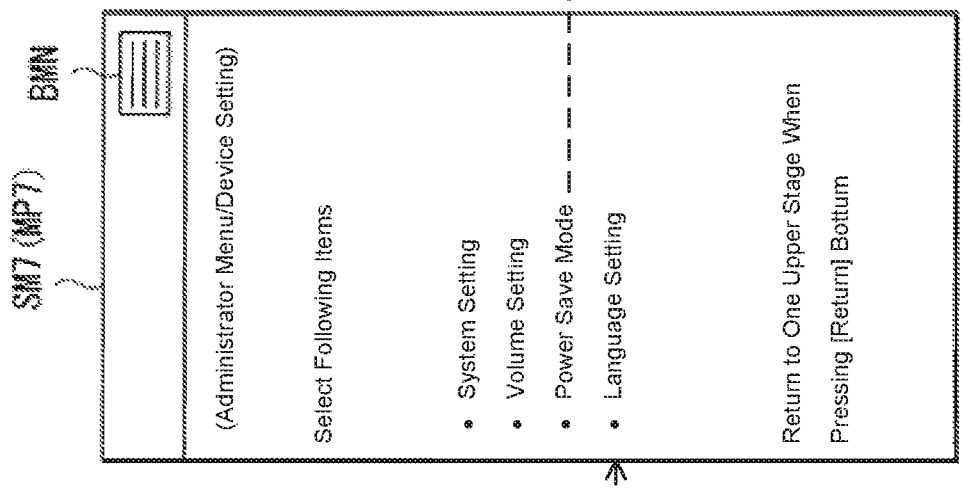
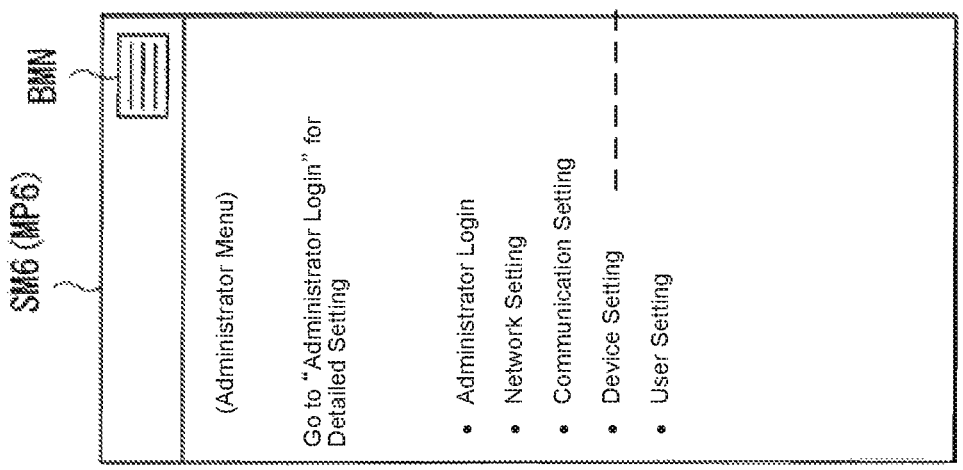

| No. | Screen Identifier ID | URL |
|---|---|---|
| 001 | 80032 | http://xxx/001/jpn/adminmenu.html |
| 002 | 80031 | http://xxx/001/enu/config_network.html |
| 003 | 80034 | http://xxx/001/enu/config_comm.html |
| .... | .... | ...... |
| .... | .... | ...... |

TBL

INFORMATION PROCESSING APPARATUS AND INFORMATION PROCESSING METHOD

TECHNICAL FIELD

The present invention relates to an information processing apparatus that processes information while communicating with a terminal apparatus, and relates to an information processing method used in such an information processing apparatus.

BACKGROUND

In recent years, a manual of an electronic apparatus or the like is often digitized. Further, such an electronic manual is often viewed on a mobile terminal. Patent Document 1 discloses an electronic manual system allowing an electronic manual to be viewed on a mobile terminal.

RELATED ART

Patent Document

[Patent Document 1] Japanese Patent Laid-Open Publication No. 2009-104263.

However, for an electronic apparatus, in general, high user convenience is desired, and further improvement in user convenience is expected.

It is desirable to provide an information processing apparatus and an information processing method that can enhance user convenience.

SUMMARY

An information processing apparatus disclosed in the application, which connects a terminal apparatus through a network, includes a display unit that displays first explanatory information of the terminal apparatus, an input unit that receives a user operation input by a user, a first acquisition unit that, when the display unit displays the first explanatory information, based on a first instruction from the input unit, acquires a first identifier corresponding to the first explanatory information displayed by the display unit, the first instruction being one type of the user operation, and a first communication unit that transmits the first identifier acquired by the first acquisition unit to the terminal apparatus.

An information processing method disclosed in the application, which is performed by an information processing apparatus that communicates with an terminal apparatus through a network, includes causing a display unit of the information processing apparatus to display first explanatory information of the terminal apparatus, causing an input unit of the information processing apparatus to receive a user operation input by a user, causing the information processing apparatus to acquire a first identifier corresponding to the first explanatory information displayed by the display unit and to transmit the first identifier to the terminal apparatus, based on a first instruction from the input unit, the first instruction being one type of the user operation; and causing the terminal apparatus to receive the first identifier and to display a first operation screen corresponding to the first identifier.

According to the information processing apparatus and the information processing method of an embodiment of the present invention, when the display unit displays the first explanatory information, a first identifier corresponding to the first explanatory information displayed by the display unit is transmitted to the terminal apparatus. Therefore, user convenience can be improved.

BRIEF DESCRIPTION OF THE DRAWINGS

FIGS. 3A-3D are explanatory diagrams illustrating examples of manual pages displayed on a mobile terminal.

FIG. 6 is a sequence diagram illustrating an operation example of the information processing system according to the first embodiment.

FIG. 7 is a sequence diagram illustrating another operation example of the information processing system according to the first embodiment.

FIGS. 13A-13C are explanatory diagrams illustrating examples of manual pages displayed on a mobile terminal according to a third embodiment.

FIGS. 21A-21C are explanatory diagrams illustrating examples of manual pages displayed on a mobile terminal according to the fourth embodiment.

DETAILED DESCRIPTIONS OF PREFERRED EMBODIMENTS

In the following, embodiments of the present invention are described with reference to the drawings. The description will be given in the following order:

1. First embodiment (example of an installed manual)
2. Second embodiment (example of an online manual)
3. Third embodiment (example of synchronizing a language used in an operation screen)
4. Fourth embodiment (example of controlling an synchronous operation according to necessity of authentication and the like)
5. Fifth embodiment (example of controlling an synchronous operation according to an installation status of optional hardware)
6. Sixth embodiment (example of setting a bookmark)

It is noted that mobile terminals hereinafter are examples of terminal apparatuses of the invention.

1. First Embodiment

[Configuration Example]

Figure 1:
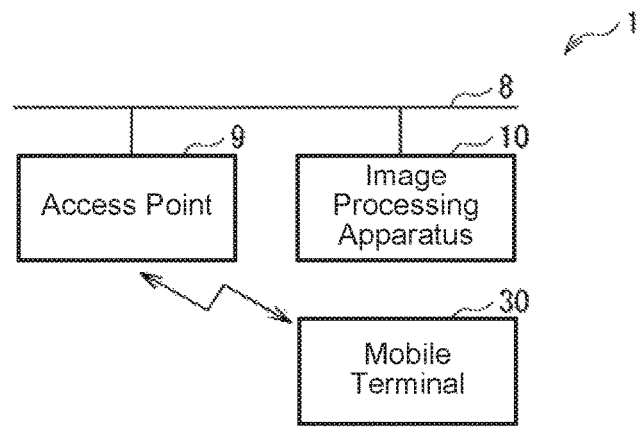
FIG. 1 is an explanatory diagram illustrating a configuration example of an information processing system according to an embodiment.

FIG. 1 illustrates a configuration example of an information processing system (information processing system 1) having an information processing apparatus according to a first embodiment of the present invention. The information processing method according to the embodiments of the present disclosure is embodied by the present embodiment and thus will be described together with the information processing apparatus. The information processing system 1 synchronizes an operation screen of an electronic apparatus (image processing apparatus in this example) with a page of a manual displayed on the information processing apparatus. The information processing system 1 includes an image processing apparatus 10, an access point 9, and a mobile terminal 30.

The image processing apparatus 10 is a so-called multi-function peripheral (MFP) having a copy function, a facsimile function, a scan function, a print function, and the like. The image processing apparatus 10 is connected to a wired network 8. The wired network 8 is configured using, for example, a wired LAN (Local Area Network). As will be described later, the image processing apparatus 10 has, for example, a display unit that displays an operation screen SO, and a user can instruct processing by operating the operation screen SO.

Figure 2A:
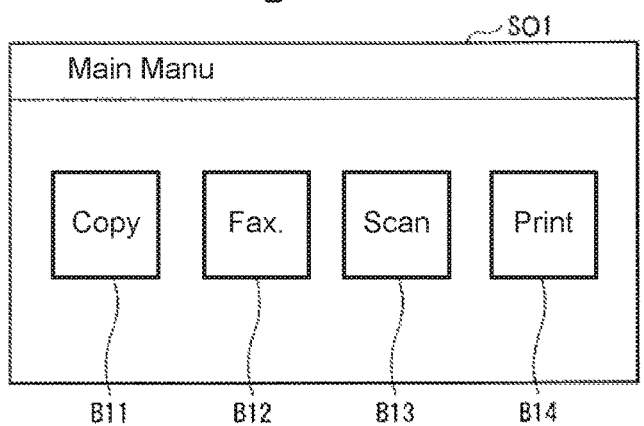
FIG. 2A is an explanatory diagram illustrating an example of an operation screen displayed on an image processing apparatus.
Figure 2B:
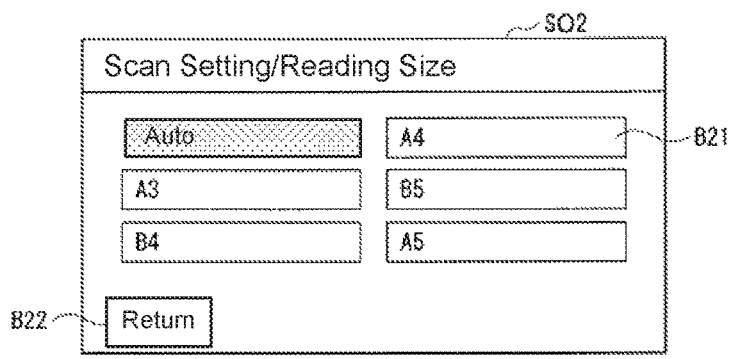
FIG. 2B is an explanatory diagram illustrating an example of another operation screen displayed on the image processing apparatus.

FIGS. 2A and 2B illustrate examples of operation screens SO (operation screens SO1, SO2) displayed on the image processing apparatus 10. The operation screen SO1 is a screen showing a main menu, and includes, in this example, a "Copy" button B11, a "Fax" button B12, a "Scan" button B13 and a "Print" button B14. In the image processing apparatus 10, for example, when the user operates the "Copy" button B11, a sub menu for executing the copy function is displayed; when the user operates the "Fax" button B12, a sub menu for executing the facsimile function is displayed; when the user operates the "Scan" button B13, a sub menu for executing the scan function is displayed; and when the user operates the "Print" button B14, a sub menu for executing the print function is displayed. The operation screen SO2 is for setting a size (reading size) of a document to be read in the scanning function. The operation screen SO2 includes multiple selection buttons B21 for selecting a reading size and a "Return" button B22. In the image processing apparatus 10, for example, when the user operates one of the multiple selection buttons B21, a reading size corresponding to that selection button B21 is selected. Further, for example, when the user operates the "return" button B22, the sub menu for executing the scan function is displayed.

The access point 9 is an access point of a wireless LAN. The access point 9 is connected to the wired network 8.

The mobile terminal 30 is a smartphone in this example. The present invention is not limited to this, and a tablet terminal or a notebook personal computer, for example, may be used instead. The mobile terminal 30 is configured to be able to connect to the access point 9 using a wireless LAN. As a result, the mobile terminal 30 can communicate with the image processing apparatus 10 connected to the wired network 8 via the access point 9.

A method for communication connection between the mobile terminal 30 and the image processing apparatus 10 is not limited to this method. For example, the image processing apparatus 10 may be connected to the access point 9 using a wireless LAN. In this case, the mobile terminal 30 communicates with the image processing apparatus 10 without going through the wired network 8. Further, for example, the mobile terminal 30 may directly communicate with the image processing apparatus 10 using, for example, Bluetooth (registered trademark).

In the mobile terminal 30, an operation manual MAN of the image processing apparatus 10 is installed. The operation manual MAN is a so-called electronic manual and includes, for example, multiple manual pages MP written in HTML (Hyper Text Markup Language) format. The manual pages MP are linked to each other by making use of so-called hyperlinks. The user can efficiently examine an operation method of the image processing apparatus 10 by operating the mobile terminal 30 to view the manual pages MP that are linked to each other.

FIGS. 3A-3D illustrate examples of manual screens SM (manual screens SM1-SM3) displayed on the mobile terminal 30. The manual screen SM 1 (FIG. 3A) is a screen when the manual page MP1 in which information about use of the scan function is described is displayed. This manual screen SM1 includes four items ("Set Document (or original document)," "Set Scan," "Display Preview," and "Execute scan"). Hyperlinks are set for these four items, and a manual page MP corresponding to one of the items is displayed next according to an operation by the user. For example, when the user operates an item about "Scan Setting," the mobile terminal 30 displays the manual screen SM2 (FIG. 3B). This manual screen SM2 is a screen when the manual page MP2 in which information about scan setting is described is displayed. This manual screen SM2 includes four items ("Document Type," "Resolution," "Reading Size" and "Color Tone"). Hyperlinks are similarly set for these four items. For example, when the user operates an item about "Reading Size," the mobile terminal 30 displays the manual screen SM3 (FIG. 3C). The manual screen SM3 is a screen when a manual page MP3 in which information about the reading size is described is displayed.

Further, as illustrated in FIGS. 3A-3C, each manual screen SM includes a menu button BMN. Then, when the user operates the menu button BMN, as illustrated in FIG. 3D, a menu MN is displayed so as to overlap the manual screen SM. This menu MN includes two items ("Sync. Switch of Operation Screen" and "Sync. Switch of Manual Page"). When the user operates this menu MN, for example, the operation screen SO displayed on the image processing apparatus 10 and the manual page MP displayed on the mobile terminal 30 can be synchronize with each other.

Specifically, in the information processing system 1, for example, in a case where the mobile terminal 30 displays a certain manual page MP (for example, the manual page MP3 (FIG. 3C)), when the user operates the mobile terminal 30 to select the "Sync. Switch of Operation Screen" of the menu MN, an operation screen SO (for example, the operation screen SO2 (FIG. 2B)) corresponding to the content of the manual page MP can be displayed on the image processing apparatus 10. As a result, the user can easily cause the operation screen SO corresponding to the manual page MP to be displayed on the image processing apparatus 10 while viewing the manual page MP displayed by the mobile terminal 30. As a result, in the information processing system 1, it is possible to save time and effort of the user in sequentially operating from the operation screen SO1 (FIG. 2A) showing the main menu until an operation screen SO that the user wants to operate is displayed.

Further, in the information processing system 1, for example, in a case where the image processing apparatus 10 displays a certain operation screen SO (for example, the operation screen SO2 (FIG. 2B)), when the user operates the mobile terminal 30 to select the "Sync. Switch Of Manual Page" of the menu MN, a manual page MP (for example, the manual page MP3 (FIG. 3C)) corresponding to the content of the operation screen SO can be displayed on the mobile terminal 30. As a result, the user can easily display the manual page MP corresponding to the operation screen SO on the mobile terminal 30 while operating the operation screen SO in the image processing apparatus 10. As a result, in the information processing system 1, it is possible to save time and effort of the user in sequentially operating from a top page of the operation manual MAN until a manual page MP that the user wants to view is displayed.

In the information processing system 1, when the operation screen SO displayed on the image processing apparatus 10 and the manual page MP displayed on the mobile terminal 30 are synchronized with each other, a screen identifier ID is exchanged between the image processing apparatus 10 and the mobile terminal 30. This screen identifier ID is an identifier for identifying the operation screen SO displayed on the image processing apparatus 10. For example, mutually different screen identifiers ID are respectively assigned to the operation screens SO. Further, in a HTML header of a manual page MP (for example, the manual page MP3 (FIG. 3C) displayed on the mobile terminal 30, a screen identifier ID of an operation screen SO (for example, the operation screen SO2 (FIG. 2B)) corresponding to the manual page MP is described.

As a result, in the information processing system 1, for example, in a case where the mobile terminal 30 displays a certain manual page MP, when the user operates the mobile terminal 30 to select the "Sync. Switch Of Operation Screen" of the menu MN, the mobile terminal 30 supplies the screen identifier ID described in the HTML header of the manual page MP to the image processing apparatus 10. Then, based on the screen identifier ID, the image processing apparatus 10 displays the operation screen SO corresponding to the screen identifier ID.

Further, for example, in a case where the image processing apparatus 10 displays a certain operation screen SO, when the user operates the mobile terminal 30 to select the "Sync. Switch Of Manual Page" of the menu MN, the mobile terminal 30 acquires a screen identifier ID corresponding to the operation screen SO from the image processing apparatus 10. Then, based on the screen identifier ID, the mobile terminal 30 identifies the manual page MP of which the screen identifier ID is described in the HTML header and displays the manual page MP.

Figure 4:
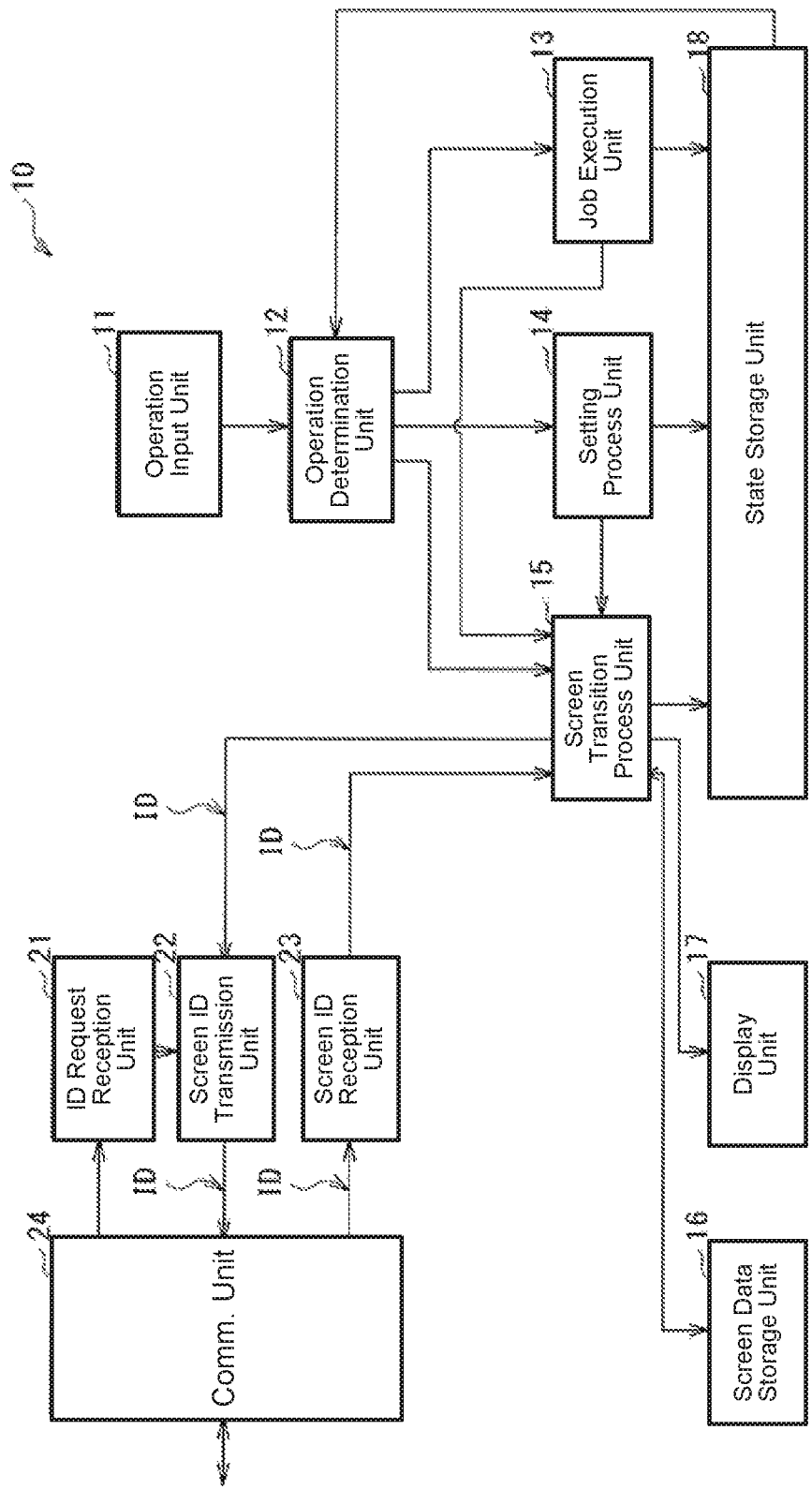
FIG. 4 is a block diagram illustrating a configuration example of an image processing apparatus according to a first embodiment.

(Image Processing Apparatus 10) FIG. 4 illustrates a configuration example of the image processing apparatus 10. The image processing apparatus 10 includes an operation input unit 11, an operation determination unit 12, a job execution unit 13, a setting process unit 14, a screen transition process unit 15, a screen data storage unit 16, a display unit 17, a state storage unit 18, an identifier request reception unit 21, a screen identifier transmission unit 22, a screen identifier reception unit 23, and a communication unit 24.

The operation input unit 11 accepts an operation of a user, and is configured using, for example, various hardware keys and a touch panel.

The operation determination unit 12 determines an operation of the user input using the operation input unit 11. Then, the operation determination unit 12 instructs the job execution unit 13, the setting process unit 14 and the screen transition process unit 15 according to a result of the determination. Specifically, the operation determination unit 12 determines an operation of the user based on the operation of the user and information (state information INFS) about a current state of the image processing apparatus 10 stored in the state storage unit 18. For example, in a case where the current state of the image processing apparatus 10 is in a state in which the operation screen SO1 (FIG. 2A) is displayed, when the user operates the "scan" button B13, the operation determination unit 12 instructs the screen transition process unit 15 such that the display unit 17 displays the sub menu for executing the scan function.

The job execution unit 13 executes jobs relating to copying, faxing, scanning and printing based on instructions from the operation determination unit 12. Further, for example, when execution of a job is terminated, the job execution unit 13 instructs the screen transition process unit 15 such that the display unit 17 displays information indicating the end of the execution of the job. Further, the job execution unit 13 also has a function of updating the state information INFS stored in the state storage unit 18 based on a processing result.

The setting process unit 14 performs various settings of the image processing apparatus 10 based on an instruction from the operation determination unit 12. Further, when a change is made to the various settings of the image processing apparatus 10, the setting process unit 14 instructs the screen transition process unit 15 such that the display unit 17 displays information indicating the change of the settings. Further, the setting process unit 14 also has a function of updating the state information INFS stored in the state storage unit 18 when a change is made to the various settings of the image processing apparatus 10.

Based on instructions from the operation determination unit 12, the job execution unit 13 and the setting process unit 14, the screen transition process unit 15 transitions the operation screen SO displayed in the display unit 17 using the multiple operation screens SO stored in the screen data storage unit 16. Further, based on the screen identifier ID supplied from the screen identifier reception unit 23, the screen transition process unit 15 selects, from the multiple operation screens SO stored in the screen data storage unit 16, an operation screen SO corresponding to the screen identifier ID. Then, the screen transition process unit 15 also has a function of transitioning the operation screen SO displayed in the display unit 17 from the currently displayed operation screen SO to the selected operation screen SO. Further, the screen transition process unit 15 also has a function of supplying the screen identifier ID corresponding to the operation screen SO currently displayed by the display unit 17 to the screen identifier transmission unit 22. Further, the screen transition process unit 15 also has a function of updating the state information INFS stored in the state storage unit 18 when the operation screen SO is transitioned.

The screen data storage unit 16 stores the multiple operation screens SO to be displayed in the display unit 17 of the image processing apparatus 10 together with the corresponding screen identifiers ID.

The display unit 17 displays an operation screen SO based on an instruction from the screen transition process unit 15, and is configured using, for example, a liquid crystal display.

The state storage unit 18 stores information (state information INFS) about the current state of the image processing apparatus 10. Specifically, the state information INFS includes, for example, various initial settings in the copy function, the facsimile function, the scan function and the print function, a network setting for connecting the image processing apparatus 10 to the wired network 8, and the like. Further, the status information INFS further also includes, for example, various flags for controlling the operation of the image processing apparatus 10 and information about the operation screen OP currently displayed in the display unit 17.

The identifier request reception unit 21 receives a transmission request of the screen identifier ID transmitted from the mobile terminal 30 via the communication unit 24. Then, the identifier request reception unit 21 instructs the screen identifier transmission unit 22 to transmit the screen identifier ID to the mobile terminal 30. Based on an instruction from the identifier request reception unit 21, the screen identifier transmission unit 22 transmits the screen identifier ID supplied from the screen transition process unit 15 to the mobile terminal 30 via the communication unit 24.

The screen identifier reception unit 23 receives the screen identifier ID transmitted from the mobile terminal 30 via the communication unit 24. Then, the screen identifier reception unit 23 supplies the screen identifier ID to the screen transition process unit 15.

The communication unit 24 communicates with the mobile terminal 30. In this example, the communication unit 24 is a network interface for connecting to the wired network 8.

Figure 5:
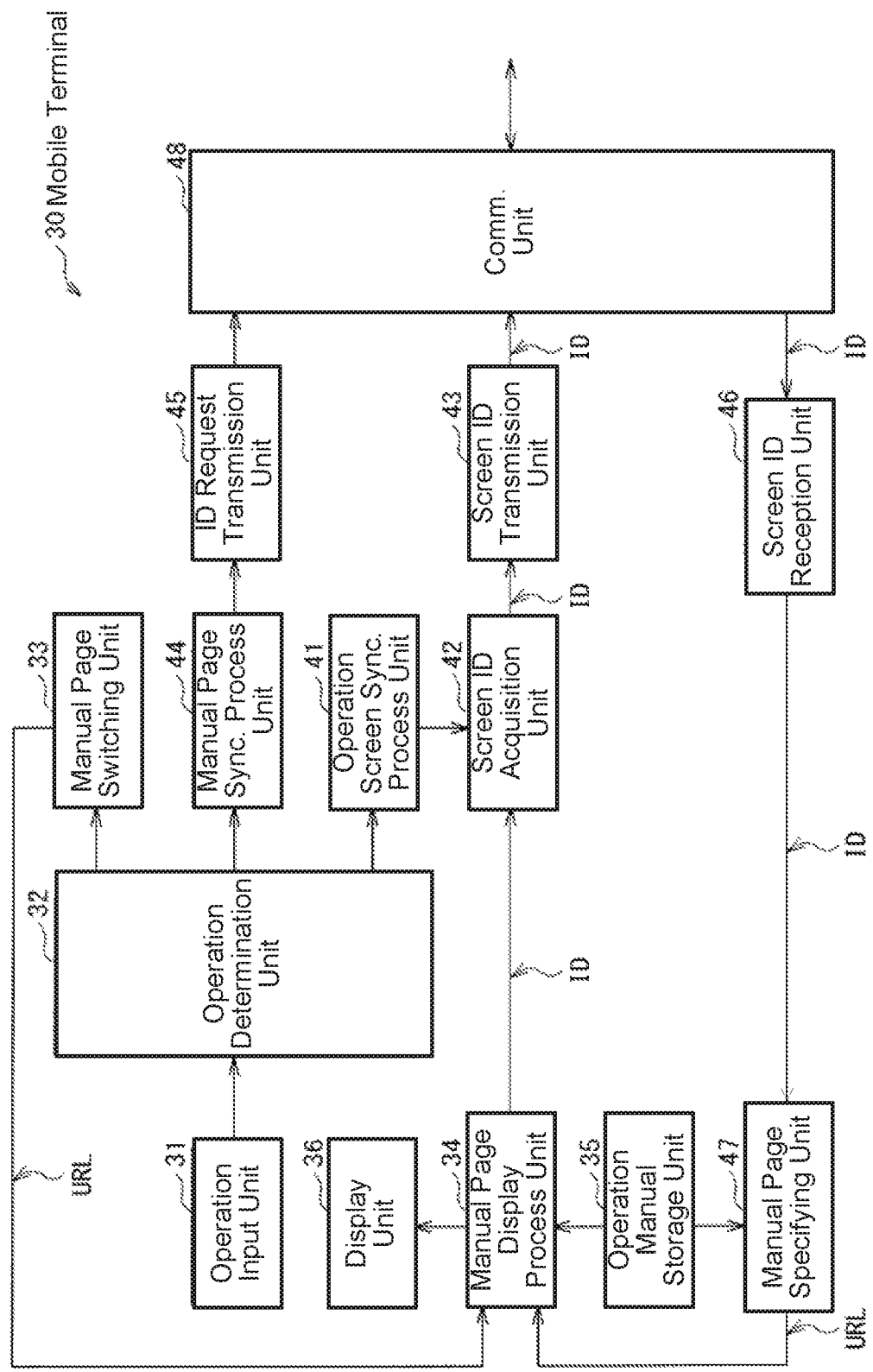
FIG. 5 is a block diagram illustrating a configuration example of a mobile terminal according to the first embodiment.

(Mobile Terminal 30) FIG. 5 illustrates a configuration example of the mobile terminal 30. The mobile terminal 30 includes an operation input unit 31, an operation determination unit 32, a manual page switching unit 33, a manual page display process unit 34, an operation manual storage unit 35, a display unit 36, an operation screen synchronization process unit 41, a screen identifier acquisition unit 42, a screen identifier transmission unit 43, a manual page synchronization process unit 44, an identifier request transmission unit 45, a screen identifier reception unit 46, a manual page specifying unit 47, and a communication unit 48.

The operation input unit 31 accepts an operation of a user, and is configured using, for example, various hardware keys and a touch panel.

The operation determination unit 32 determines an operation of the user input using the operation input unit 31. Then, the operation determination unit 32 instructs the manual page switching unit 33, the operation screen synchronization process unit 41 and the manual page synchronization process unit 44 according to a result of the determination. Specifically, in a case where the user operates a hyperlinked item on the manual page MP, the operation determination unit 32 instructs the manual page switching unit 33 such that the display unit 36 of the mobile terminal 30 displays the manual page MP of the link destination of the hyperlink. Further, in a case where the user selects the "Sync. Switch Of Operation Screen" of the menu MN, the operation determination unit 32 instructs the operation screen synchronization process unit 41 such that the display unit 17 of the image processing apparatus 10 displays the operation screen SO corresponding to the manual page MP displayed on the mobile terminal 30. Further, in a case where the user selects the "Sync. Switch Of Manual Page" of the menu MN, the operation determination unit 32 instructs the manual page synchronization process unit 44 such that the display unit 36 of the mobile terminal 30 displays the manual page MP corresponding to the operation screen SO displayed on the image processing apparatus 10.

Based on an instruction from the operation determination unit 32, the manual page switching unit 33 supplies the URL (Uniform Resource Locator) of the link destination of the hyperlink to the manual page display process unit 34.

Based on the URL supplied from the manual page switching unit 33, the manual page display process unit 34 reads out page data of the manual page MP corresponding to the URL from the operation manual storage unit 35, and supplies the page data to the display unit 36. Further, the manual page display process unit 34 also has a function of reading out the page data of the manual page MP from the operation manual storage unit 35 based on the URL supplied from the manual page specifying unit 47 and supplying the page data to the display unit 36. Further, the manual page display process unit 34 also has a function of supplying the screen identifier ID described in the HTML header of the manual page MP currently displayed by the display unit 36 to the screen identifier acquisition unit 42.

The operation manual storage unit 35 stores the operation manual MAN of the image processing apparatus 10. As described above, the operation manual MAN includes, for example, multiple manual pages MP written in HTML format. The manual pages MP are each associated with a URL. The manual pages MP are linked to each other by making use of hyperlinks. Further, in the HTML header of each manual page MP, a screen identifier ID of an operation screen SO corresponding to the content of the manual page MP is described.

The display unit 36 displays a manual page MP based on the page data of the manual page MP supplied from the manual page display process unit 34, and is configured using, for example, a liquid crystal display.

Based on an instruction from operation determination unit 32, the operation screen synchronization process unit 41 instructs the screen identifier acquisition unit 42 to acquire a screen identifier ID from the manual page display process unit 34. Based on an instruction from the operation screen synchronization process unit 41, the screen identifier acquisition unit 42 acquires a screen identifier ID from the manual page display process unit 34 and supplies the screen identifier ID to the screen identifier transmission unit 43. The screen identifier transmission unit 43 transmits the screen identifier ID supplied from the screen identifier acquisition unit 42 to the image processing apparatus 10 via the communication unit 48.

Based on an instruction from the operation determination unit 32, the manual page synchronization process unit 44 instructs the identifier request transmission unit 45 to transmit a transmission request of a screen identifier ID to the image processing apparatus 10. Based on an instruction from the manual page synchronization process unit 44, the identifier request transmission unit 45 transmits a transmission request of a screen identifier ID to the image processing apparatus 10 via the communication unit 48.

The screen identifier reception unit 46 receives, via the communication unit 48, the screen identifier ID transmitted from the image processing apparatus 10 in response to the transmission request transmitted by the identifier request transmission unit 45. Then, the screen identifier reception unit 46 supplies the screen identifier ID to the manual page specifying unit 47. Based on the screen identifier ID supplied from the screen identifier reception unit 46, the manual page specifying unit 47 specifies, among the multiple manual pages MP stored in the operation manual storage unit 35, a manual page MP in which the screen identifier ID is described in the HTML header, and acquires the URL of the manual page MP. Then, the manual page specifying unit 47 supplies the acquired URL of the manual page MP to the manual page display process unit 34.

The communication unit 48 communicates with the image processing apparatus 10. In this example, the communication unit 48 is a network interface for connecting to the access point 9 using a wireless LAN.

Here, the mobile terminal 30 corresponds to a specific example of an "information processing apparatus" in the present invention. The manual page MP corresponds to a specific example of "explanatory information" in the present invention. The screen identifier ID corresponds to a specific example of an "identifier" in the present invention. The operation input unit 31 corresponds to a specific example of an "input unit" in the present invention. The screen identifier transmission unit 43, the screen identifier reception unit 46 and the communication unit 48 correspond to a specific example of a "first communication unit" in the present invention. The screen identifier acquisition unit 42 corresponds to a specific example of a "first acquisition unit" in the present invention. The operation manual storage unit 35 corresponds to a specific example of a "storage unit" in the present invention. The manual page display process unit 34 and the manual page specifying unit 47 correspond to a specific example of a "second acquisition unit" in the present invention. The job execution unit 13 corresponds to a specific example of an "image forming unit" in the present invention.

Operation and Effect

Next, operation and effect of the information processing system 1 of the present embodiment is described.

(Overall Operation Overview)

First, with reference to FIGS. 4 and 5, an overall operation overview of the information processing system 1 is described.

In the image processing apparatus 10, the operation input unit 11 accepts a user operation, and the operation determination unit 12 determines a user operation input via the operation input unit 11. Then, the operation determination unit 12 instructs the job execution unit 13, the setting process unit 14 and the screen transition process unit 15 according to a result of the determination. The job execution unit 13 executes jobs relating to copying, faxing, scanning and printing based on instructions from the operation determination unit 12. The setting process unit 14 performs various settings of the image processing apparatus 10 based on an instruction from the operation determination unit 12. Based on instructions from the operation determination unit 12, the job execution unit 13 and the setting process unit 14, the screen transition process unit 15 transitions the operation screen SO displayed in the display unit 17 using the multiple operation screens SO stored in the screen data storage unit 16.

In the mobile terminal 30, the operation input unit 31 accepts a user operation, and the operation determination unit 32 determines a user operation input via the operation input unit 31. Then, the operation determination unit 32 instructs the manual page switching unit 33, the operation screen synchronization process unit 41 and the manual page synchronization process unit 44 according to a result of the determination.

For example, in the case where the user operates a hyperlinked item on the manual page MP, the operation determination unit 32 instructs the manual page switching unit 33 such that the display unit 36 of the mobile terminal 30 displays the manual page MP of the link destination of the hyperlink.

Further, for example, in the case where the user selects the "Sync. Switch Of Operation Screen" of the menu MN, the operation determination unit 32 instructs the operation screen synchronization process unit 41 such that the display unit 17 of the image processing apparatus 10 displays the operation screen SO corresponding to the manual page MP displayed on the mobile terminal 30. As a result, the mobile terminal 30 supplies the screen identifier ID described in the HTML header of the manual page MP displayed by the mobile terminal 30 to the image processing apparatus 10.

Then, based on the screen identifier ID, the image processing apparatus 10 displays the operation screen SO corresponding to the screen identifier ID.

Further, for example, in the case where the user selects the "Sync. Switch Of Manual Page" of the menu MN, the operation determination unit 32 instructs the manual page synchronization process unit 44 such that the display unit 36 of the mobile terminal 30 displays the manual page MP corresponding to the operation screen SO displayed on the image processing apparatus 10. As a result, the mobile terminal 30 acquires the screen identifier ID corresponding to the operation screen SO displayed by the image processing apparatus 10 from the image processing apparatus 10. Then, based on the screen identifier ID, the mobile terminal 30 identifies the manual page MP of which the screen identifier ID is described in the HTML header and displays the manual page MP.

(Detailed Operation)

Next, the operation of the information processing system 1 is described in detail. In the following, the case where the user operates a hyperlinked item on the manual page MP (case C1), the case where the user selects the "Sync. Switch Of Operation Screen" of the menu MN (case C2), and the case where the user selects the "Sync. Switch Of Manual Page" of the menu MN (case C3) are described in this order.

(Case C1)

In the case where the user operates a hyperlinked item on the manual page MP, first, based on an instruction from the operation determination unit 32, the manual page switching unit 33 supplies the URL of the link destination of the hyperlink to the manual page display process unit 34. Next, the manual page display process unit 34 reads out the page data of the manual page MP corresponding to the URL from the operation manual storage unit 35, and supplies the page data to the display unit 36. Then, the display unit 36 displays the manual page MP based on the page data of the manual page MP supplied from the manual page display process unit 34.

(Case C2)

FIG. 6 illustrates an operation example of the information processing system 1 in the case where the user selects the "Sync. Switch Of Operation Screen" of the menu MN. In FIG. 6, the operation of the user is shown in parentheses. In this case, the information processing system 1 synchronizes the operation screen SO displayed on the image processing apparatus 10 with the manual page MP displayed by the mobile terminal 30. In the following, this operation is described in detail.

In a case where the display unit 36 of the mobile terminal 30 displays a manual page MP, when the user operates the mobile terminal 30 to select the "Sync. Switch Of Operation Screen" of the menu MN, the operation determination unit 32 of the mobile terminal 30 determines that the user operation is an instruction to synchronize the operation screen SO with the manual page MP (step S101). Then, the operation determination unit 32 issues an instruction to the operation screen synchronization process unit 41.

Next, the screen identifier acquisition unit 42 acquires the screen identifier ID of the manual page MP currently displayed by the display unit 36 (step S102). Specifically, based on an instruction from the operation screen synchronization process unit 41, the screen identifier acquisition unit 42 acquires the screen identifier ID described in the HTML header of the manual page MP currently displayed by the display unit 36 from the manual page display process unit 34. Then, the screen identifier acquisition unit 42 supplies the screen identifier ID to the screen identifier transmission unit 43.

Next, the screen identifier transmission unit 43 transmits the screen identifier ID to the image processing apparatus 10 (step S103). Then, the screen identifier reception unit 23 of the image processing apparatus 10 receives the screen identifier ID transmitted from the mobile terminal 30 and supplies the screen identifier ID to the screen transition process unit 15.

Then, the screen transition process unit 15 and the display unit 17 of the image processing apparatus 10 display an operation screen SO based on the screen identifier ID (step S104). Specifically, based on the screen identifier ID supplied from the screen identifier reception unit 23, the screen transition process unit 15 selects, from the multiple operation screens SO stored in the screen data storage unit 16, an operation screen SO corresponding to the screen identifier ID, and supplies the selected operation screen SO to the display unit 17. Then, the display unit 17 displays the operation screen SO.

As a result, this sequence is terminated.

(Case C3)

FIG. 7 illustrates an operation example of the information processing system 1 in the case where the user selects the "Sync. Switch Of Manual Page" of the menu MN. In this case, the information processing system 1 synchronizes the manual page MP displayed on the mobile terminal 30 with the operation screen SO displayed by the image processing apparatus 10. In the following, this operation is described in detail.

In a case where the display unit 17 of the image processing apparatus 10 displays an operation screen SO, when the user operates the mobile terminal 30 to select the "Sync. Switch Of Manual Page" of the menu MN, the operation determination unit 32 of the mobile terminal 30 determines that the user operation is an instruction to synchronize the manual page MP with the operation screen SO (step S111). Then, the operation determination unit 32 issues an instruction to the manual page synchronization process unit 44.

Next, based on an instruction from the manual page synchronization process unit 44, the identifier request transmission unit 45 transmits a transmission request of a screen identifier ID to the image processing apparatus 10 (step S112). Then, the identifier request reception unit 21 of the image processing apparatus 10 receives the transmission request of the screen identifier ID transmitted from the mobile terminal 30.

Next, based on an instruction from the identifier request reception unit 21, the screen identifier transmission unit 22 of the image processing apparatus 10 transmits the screen identifier ID supplied from the screen transition process unit 15 to the mobile terminal 30 (step S113). The screen identifier reception unit 46 of the mobile terminal 30 receives the screen identifier ID transmitted from the image processing apparatus 10 and supplies the screen identifier ID to the manual page specifying unit 47.

Next, the manual page specifying unit 47 acquires the URL of the manual page MP based on the screen identifier ID supplied from the screen identifier reception unit 46 (step S114). Specifically, based on the screen identifier ID, the manual page specifying unit 47 specifies, among the multiple manual pages MP stored in the operation manual storage unit 35, a manual page MP in which the screen identifier ID is described in the HTML header, and acquires the URL of the manual page MP.

Then, the manual page display process unit 34 and the display unit 36 display the manual page MP based on the URL of the manual page MP (step S115). Specifically, the manual page display process unit 34 reads out the page data of the manual page MP from the operation manual storage unit 35 based on the URL supplied from the manual page specifying unit 47 and supplies the page data to the display unit 36. Then, the display unit 36 displays the manual page MP based on the page data of the manual page MP supplied from the manual page display process unit 34.

As a result, this sequence is terminated.

As described above, in the information processing system 1, as shown in the case C2, the operation screen SO corresponding to the content of the manual page MP currently displayed by the mobile terminal 30 can be displayed on the image processing apparatus 10. As a result, the user can easily cause the operation screen SO corresponding to the manual page MP to be displayed on the image processing apparatus 10 while viewing the manual page MP displayed by the mobile terminal 30. As a result, in the information processing system 1, it is possible to save time and effort of the user in sequentially operating from the operation screen SO1 (FIG. 2A) showing the main menu until an operation screen SO that the user wants to operate is displayed.

Further, in the information processing system 1, as shown in the case C3, the manual page MP corresponding to the content of the operation screen SO currently displayed by the image processing apparatus 10 can be displayed on the mobile terminal 30. As a result, the user can easily display the manual page MP corresponding to the operation screen SO on the mobile terminal 30 while operating the operation screen SO in the image processing apparatus 10. As a result, in the information processing system 1, it is possible to save time and effort of the user in sequentially operating from a top page of the operation manual MAN until a manual page MP that the user wants to view is displayed.

Further, in the information processing system 1, the user operates the menu MN to synchronize the operation screen SO displayed on the image processing apparatus 10 with the manual page MP displayed by the mobile terminal 30 or to synchronize the manual page MP displayed on the mobile terminal 30 with the operation screen SO displayed by the image processing apparatus 10. As a result, for example, in the information processing system 1, synchronization can be performed only when synchronization is desired. Therefore, user convenience can be improved as compared to a case where synchronization is constantly performed. That is, in the case where the operation screen SO and the manual page MP are constantly synchronized with each other, for example, when the user operates the mobile terminal 30 to switch the manual page MP, the operation screen SO displayed by the image processing apparatus 10 is switched accordingly. Therefore, for example, the user cannot view other manual pages MP while maintaining the operation screen SO displayed by the image processing apparatus 10. On the other hand, in the information processing system 1, the user operates the menu MN to synchronize the operation screen SO and the manual page MP with each other. Therefore, for example, the user can freely examine the operation method of the image processing apparatus 10 while maintaining the operation screen SO displayed by the image processing apparatus 10. Therefore, user convenience can be improved.

[Effects] As described above, in the present embodiment, the operation screen corresponding to the content of the manual page currently displayed by the mobile terminal is displayed on the image processing apparatus. Therefore, user convenience can be improved.

In the present embodiment, the manual page corresponding to the content of the operation screen currently displayed by the image processing apparatus is displayed on the mobile terminal 30. Therefore, user convenience can be improved.

In the present embodiment, the user operates the menu MN to synchronize the operation screen and the manual page with each other. Therefore, user convenience can be improved.

2. Second Embodiment

Next, an information processing system 2 according to a second embodiment is described. The present embodiment is configured such that the operation manual MAN of the image processing apparatus 10 is viewed by accessing a server. A configuration component that is substantially the same as in the information processing system 1 according to the above first embodiment is indicated using the reference numeral symbol, and description thereof is omitted as appropriate.

Figure 8:
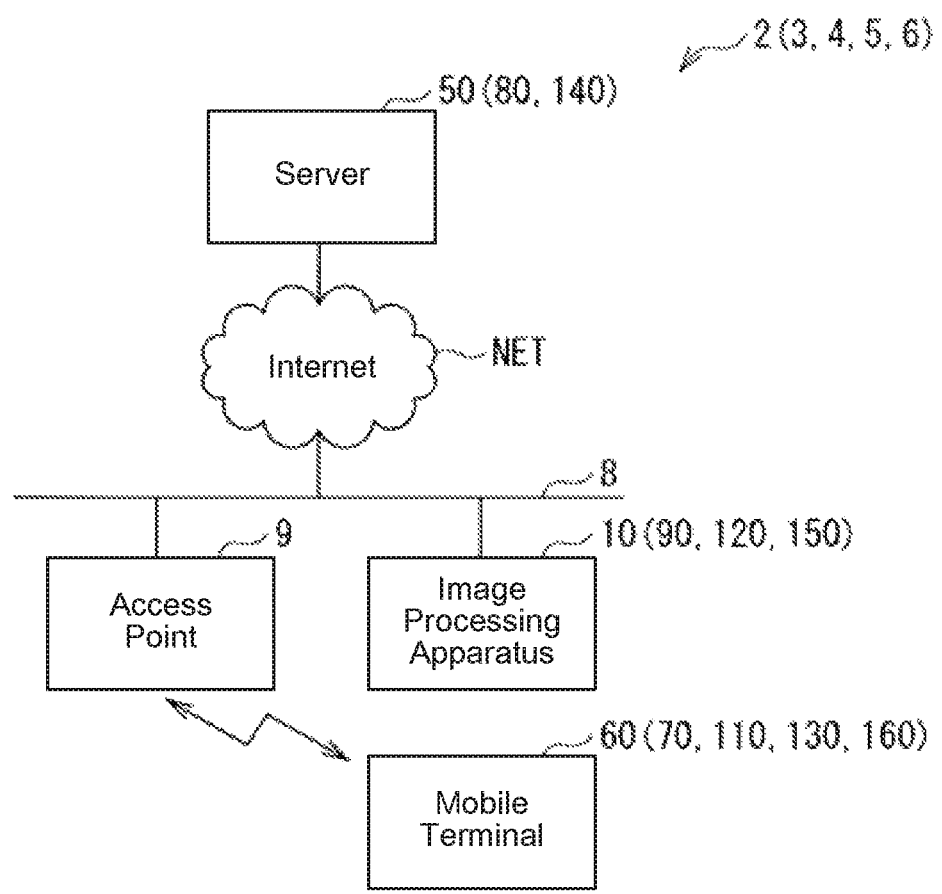
FIG. 8 is an explanatory diagram illustrating a configuration example of another information processing system according to an embodiment.

FIG. 8 illustrates a configuration example of the information processing system 2 according to the present embodiment. The information processing system 2 includes the image processing apparatus 10, the access point 9, a mobile terminal 60, and a server 50. The server 50 is connected to the wired network 8 via the Internet NET. As a result, the mobile terminal 60 can communicate with the server 50 via the access point 9, the wired network 8, and the Internet NET.

(Mobile Terminal 60)

Figure 9:
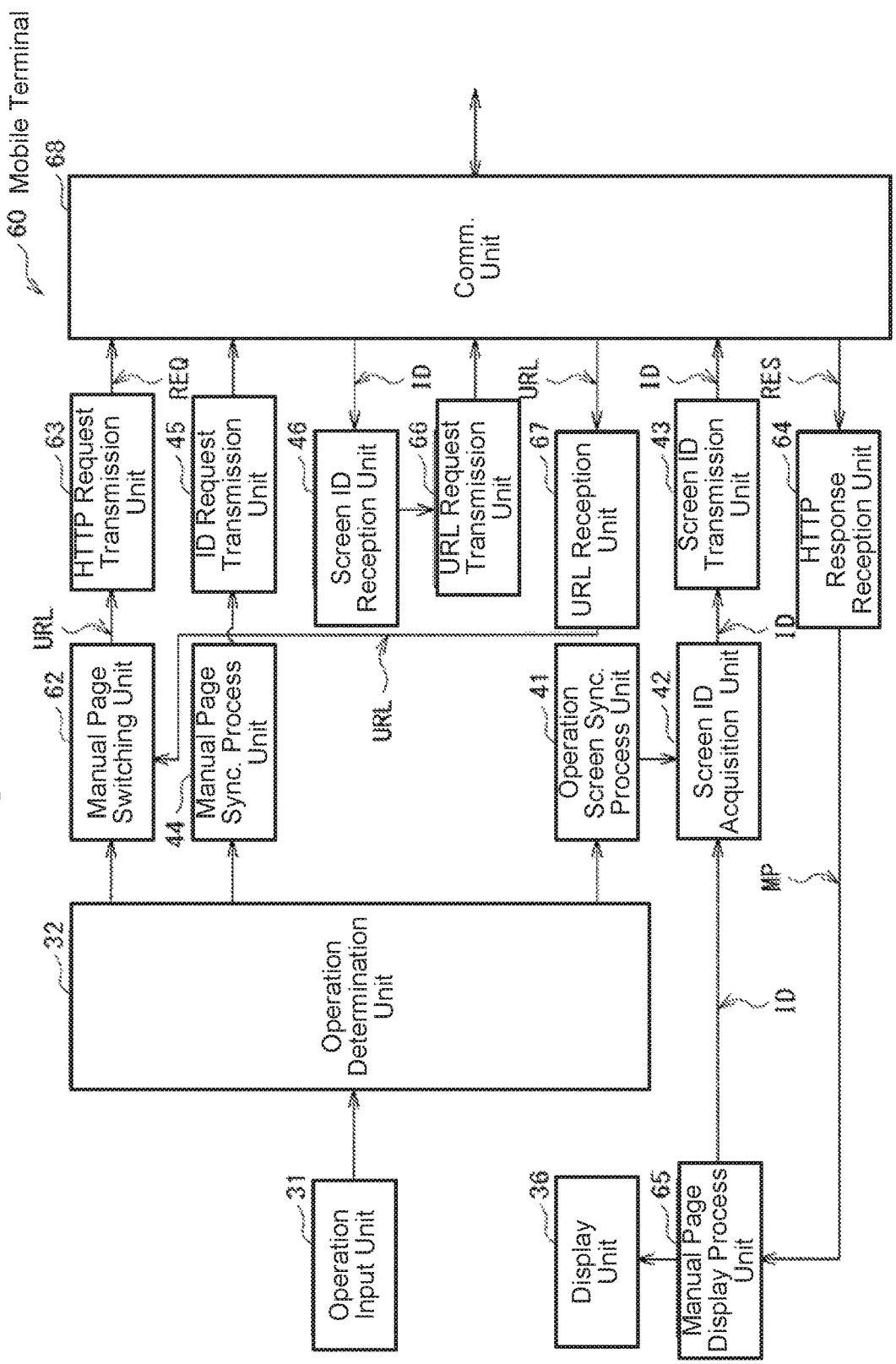
FIG. 9 is a block diagram illustrating a configuration example of a mobile terminal according to a second embodiment.

FIG. 9 illustrates a configuration example of the mobile terminal 60. The mobile terminal 60 includes a manual page switching unit 62, a HTTP (Hypertext Transfer Protocol) request transmission unit 63, a HTTP response reception unit 64, a manual page display process unit 65, a URL request transmission unit 66, a URL reception unit 67, and a communication unit 68.

Based on an instruction from the operation determination unit 32, the manual page switching unit 62 supplies the URL of the link destination of the hyperlink to the HTTP request transmission unit 63. Further, the manual page switching unit 62 also has a function of supplying the URL supplied from the URL reception unit 67 to the HTTP request transmission unit 63.

Based on the URL supplied from the manual page switching unit 62, the HTTP request transmission unit 63 generates a HTTP request REQ including the URL and transmits the generated HTTP request REQ to the server 50 via the communication unit 68.

The HTTP response reception unit 64 receives via the communication unit 68 a HTTP response RES transmitted from the server 50 in response to the HTTP request REQ transmitted by the HTTP request transmission unit 63. Then, the HTTP response reception unit 64 supplies page data of a manual page MP included in the HTTP response RES to the manual page display process unit 65.

The manual page display process unit 65 supplies the page data of the manual page MP supplied from the HTTP response reception unit 64 to the display unit 36. Further, the manual page display process unit 65 also has a function of supplying the screen identifier ID described in the HTML header of the manual page MP currently displayed by the display unit 36 to the screen identifier acquisition unit 42.

Based on the screen identifier ID corresponding to the operation screen SO displayed by the image processing apparatus 10 supplied from the screen identifier reception unit 46, the URL request transmission unit 66 transmits a URL transmission request requesting the URL of the manual page MP in which the screen identifier ID is described in the HTML header to the server 50 via the communication unit 68.

The URL reception unit 67 receives, via the communication unit 68, a URL transmitted from the server 50 in response to the URL transmission request transmitted by the URL request transmission unit 66. Then, the URL reception unit 67 supplies the received URL to the manual page switching unit 62.

The communication unit 68 communicates with the image processing apparatus 10 and the server 50.

(Server 50)

Figure 10:
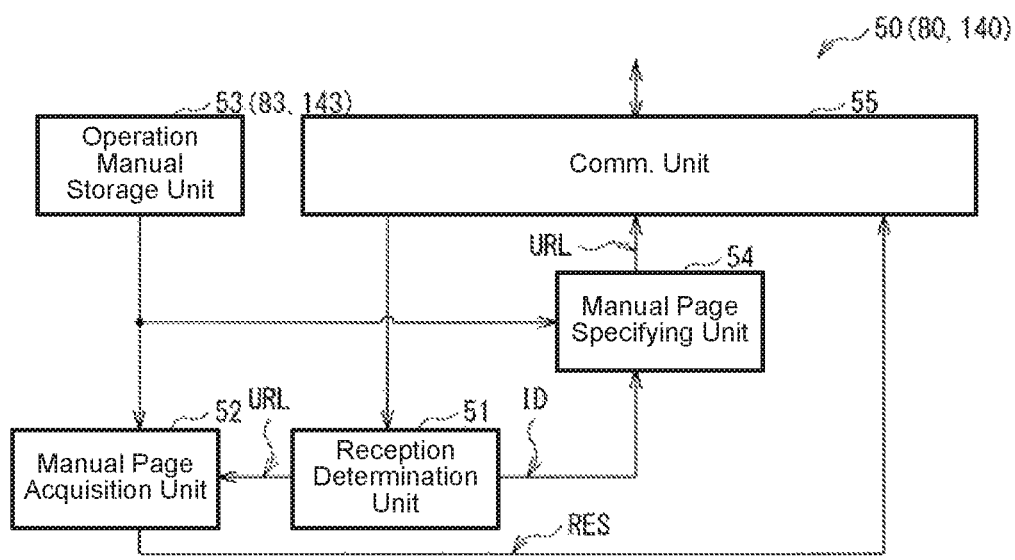
FIG. 10 is a block diagram illustrating a configuration example of a server according to the second embodiment.

FIG. 10 illustrates a configuration example of the server 50. The server 50 includes a reception determination unit 51, a manual page acquisition unit 52, an operation manual storage unit 53, and a manual page specifying unit 54.

The reception determination unit 51 receives data transmitted from the mobile terminal 60 via the communication unit 55 and determines the received data. Then, in a case where the data transmitted from the mobile terminal 60 is a HTTP request REQ, the reception determination unit 51 supplies the URL included in the HTTP request REQ to the manual page acquisition unit 52; and, in a case where the data transmitted from the mobile terminal 60 is a URL transmission request, the reception determination unit 51 supplies the screen identifier ID included in the URL transmission request to the manual page specifying unit 54.

Based on the URL supplied from the reception determination unit 51, the manual page acquisition unit 52 acquires the page data of the manual page MP corresponding to the URL from the operation manual storage unit 53. Then, the manual page acquisition unit 52 generates a HTTP response RES including the acquired page data of the manual page MP and transmits the HTTP response RES to the mobile terminal 60 via the communication unit 55.

The operation manual storage unit 53 stores the operation manual MAN of the image processing apparatus 10. This operation manual storage unit 53 corresponds to the operation manual storage unit 35 in the first embodiment. That is, in the information processing system 1 according to the first embodiment, the operation manual storage unit 35 is provided in the mobile terminal 30. In the information processing system 2 according to the present embodiment, the operation manual storage unit 53 is provided in the server 50. As a result, in the information processing system 2, a so-called online manual is realized.

Based on the screen identifier ID supplied from the reception determination unit 51, the manual page specifying unit 54 specifies, among the multiple manual pages MP stored in the operation manual storage unit 53, a manual page MP in which the screen identifier ID is described in the HTML header, and acquires the URL of the manual page MP. Then, the manual page specifying unit 54 transmits the acquired URL of the manual page MP to the mobile terminal 60 via the communication unit 55.

The communication unit 55 communicates with the mobile terminal 60. In this example, the communication unit 55 is a network interface for connecting to the Internet NET.

Here, the screen identifier transmission unit 43, the screen identifier reception unit 46 and the communication unit 68 correspond to a specific example of a "first communication unit" in the present invention. The HTTP response reception unit 64 and the communication unit 68 correspond to a specific example of a "second communication unit" in the present invention. The URL request transmission unit 66, the URL reception unit 67, the manual page switching unit 62, the HTTP request transmission unit 63 and the manual page display process unit 65 correspond to a specific example of a specific example of a "second acquisition unit" in the present invention.

(Case C1)

Figure 11:
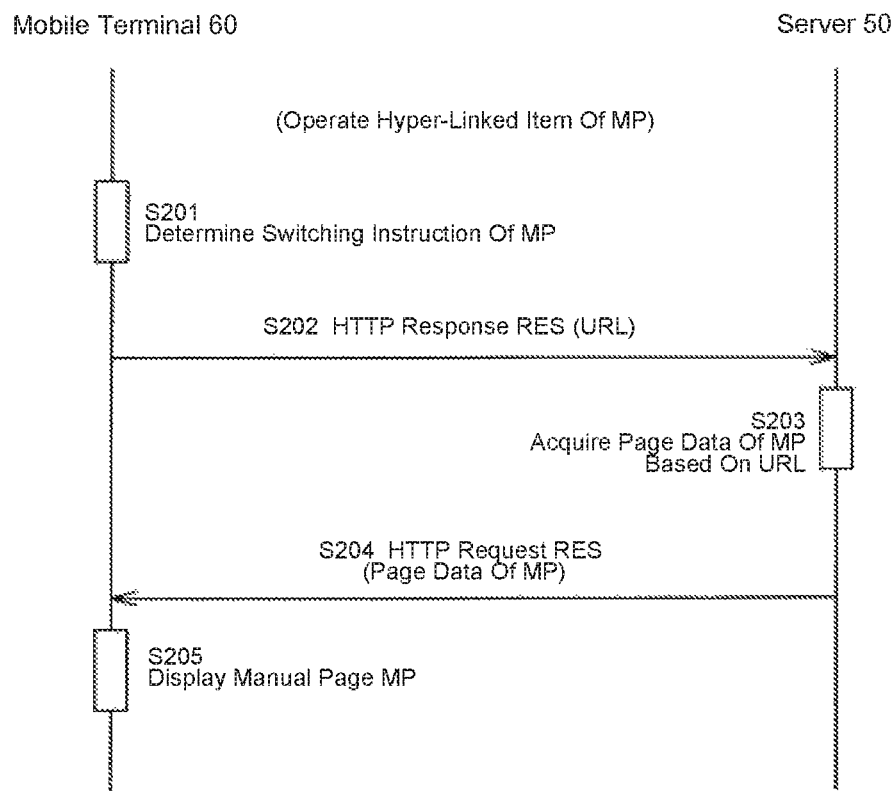
FIG. 11 is a block diagram illustrating a configuration example of a mobile terminal according to the second embodiment.

FIG. 11 illustrates an operation example of the information processing system 2 in the case where the user operates a hyperlinked item on the manual page MP. When the user operates a hyperlinked item, the operation determination unit 32 of the mobile terminal 60 determines that the user operation is an instruction to switch the manual page MP (step S201). Then, based on an instruction from the operation determination unit 32, the manual page switching unit 62 supplies the URL of the link destination of the hyperlink to the HTTP request transmission unit 63.

Next, based on the URL supplied from the manual page switching unit 62, the HTTP request transmission unit 63 generates an HTTP request REQ including the URL and transmits the generated HTTP request REQ to the server 50 (step S202). The reception determination unit 51 of the server 50 receives the HTTP request REQ and supplies the URL included in the HTTP request REQ to the manual page acquisition unit 52.

Next, based on the URL supplied from the reception determination unit 51, the manual page acquisition unit 52 of the server 50 acquires the page data of the manual page MP corresponding to the URL from the operation manual storage unit 53 (step S203).

Next, the manual page acquisition unit 52 generates a HTTP response RES including the acquired page data of the manual page MP and transmits the generated HTTP response RES to the mobile terminal 60 (step S204). The HTTP response reception unit 64 of the mobile terminal 60 receives the HTTP response RES and supplies the page data of the manual page MP included in the HTTP response RES to the manual page display process unit 65.

Then, the manual page display process unit 65 and the display unit 36 of the mobile terminal 60 display the manual page MP based on the page data of the manual page MP (step S205).

As a result, this sequence is terminated.

(Case C2)

In the case where the user selects "Sync. Switch Of Operation Screen" of the menu MN, the information processing system 2 performs the same operation as the information processing system 1 (FIG. 6) according to the case of the first embodiment.

(Case C3)

Figure 12:
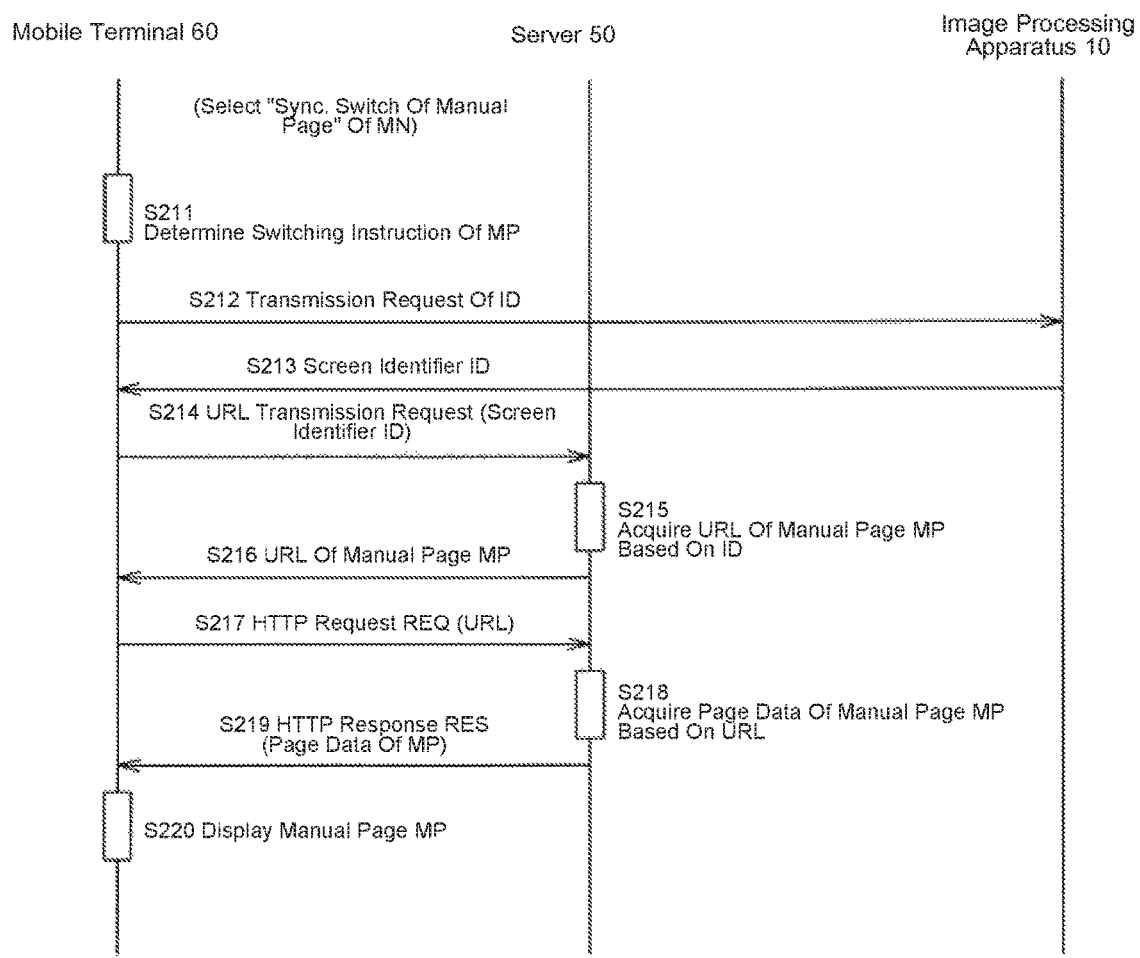
FIG. 12 is a sequence diagram illustrating an operation example of the information processing system according to the second embodiment.

FIG. 12 illustrates an operation example of the information processing system 2 in the case where the user selects the "Sync. Switch Of Manual Page" of the menu MN. In the case where the display unit 17 of the image processing apparatus 10 displays an operation screen SO, when the user selects the "Sync. Switch Of Manual Page" of the menu MN, the operation determination unit 32 of the mobile terminal 60 determines that the user operation is an instruction to synchronize the manual page MP with the operation screen SO (step S211). Then, the operation determination unit 32 issues an instruction to the manual page synchronization process unit 44.

Next, based on an instruction from the manual page synchronization process unit 44, the identifier request transmission unit 45 transmits a transmission request of a screen identifier ID to the image processing apparatus 10 (step S212). Then, the identifier request reception unit 21 of the image processing apparatus 10 receives the transmission request of the screen identifier ID transmitted from the mobile terminal 60.

Next, based on an instruction from the identifier request reception unit 21, the screen identifier transmission unit 22 of the image processing apparatus 10 transmits the screen identifier ID supplied from the screen transition process unit 15 to the mobile terminal 60 (step S213). The screen identifier reception unit 46 of the mobile terminal 60 receives the screen identifier ID transmitted from the image processing apparatus 10 and supplies the screen identifier ID to the URL request transmission unit 66.

Next, based on the screen identifier ID supplied from the screen identifier reception unit 46, the URL request transmission unit 66 of the mobile terminal 60 transmits a URL transmission request including the screen identifier ID to the server 50 (step S214). The reception determination unit 51 of the server 50 receives the URL transmission request and supplies the screen identifier ID included in the URL transmission request to the manual page specifying unit 54.

Next, the manual page specifying unit 54 of the server 50 acquires the URL of the manual page MP based on the screen identifier ID supplied from the reception determination unit 51 (step S215). Specifically, based on the screen identifier ID, the manual page specifying unit 54 specifies, among the multiple manual pages MP stored in the operation manual storage unit 53, a manual page MP in which the screen identifier ID is described in the HTML header, and acquires the URL of the manual page MP.

Next, the manual page specifying unit 54 transmits the URL of the manual page MP specified in the step S215 to the mobile terminal 60 (step S216). The URL reception unit 67 of the mobile terminal 60 receives the URL of the manual page MP and supplies the received URL to the manual page switching unit 62. The manual page switching unit 62 supplies the URL of the manual page MP received by the URL reception unit 67 to the HTTP request transmission unit 63.

Next, based on the URL supplied from the manual page switching unit 62, the HTTP request transmission unit 63 generates an HTTP request REQ including the URL and transmits the HTTP request REQ to the server 50 (step S217). The reception determination unit 51 of the server 50 receives the HTTP request REQ and supplies the URL included in the HTTP request REQ to the manual page acquisition unit 52.

Next, based on the URL supplied from the reception determination unit 51, the manual page acquisition unit 52 of the server 50 acquires the manual page MP corresponding to the URL from the operation manual storage unit 53 (step S218).

Next, the manual page acquisition unit 52 generates a HTTP response RES including the acquired page data of the manual page MP and transmits the generated HTTP response RES to the mobile terminal 60 (step S219). The HTTP response reception unit 64 of the mobile terminal 60 receives the HTTP response RES and supplies the page data of the manual page MP included in the HTTP response RES to the manual page display process unit 65.

Then, the manual page display process unit 65 and the display unit 36 of the mobile terminal 60 display the manual page MP based on the page data of the manual page MP (step S220).

As a result, this sequence is terminated.

As described above, in the information processing system 2, the operation manual MAN is stored in the server 50. Therefore, the user can save time and effort to install the operation manual MAN in the mobile terminal 60 and can reduce storage usage of the mobile terminal 60. Therefore, user convenience can be improved.

In the present embodiment, since the operation manual is stored in the server, user convenience can be improved. The other effects are the same as in the first embodiment.

3. Third Embodiment

Next, an information processing system 3 according to a third embodiment is described. The present embodiment is configured such that, according to a language used in the mobile terminal, a language of a displayed manual page MP is changed, and a language used in the image processing apparatus is temporarily changed. A configuration component that is substantially the same as in the information processing system 2 according to the above second embodiment is indicated using the reference numeral symbol, and description thereof is omitted as appropriate. As illustrated in FIG. 8, the information processing system 3 includes an image processing apparatus 90, the access point 9, a mobile terminal 70, and a server 80.

In the information processing system 3, similar to the information processing system 2 according to the second embodiment, an operation manual MAN2 is stored in the server 80. In addition to a Japanese operation manual, the operation manual MAN2 includes operation manuals written in multiple languages. Then, the mobile terminal 70 can view the operation manual MAN2 stored in the server 80.

FIGS. 13A-13C illustrate examples of manual screens SM (manual screens SM4-SM6) displayed on the mobile terminal 70. The manual screen SM4 (FIG. 13A) is a screen when a manual page MP4 in which information about an administrator menu is described is displayed. The manual screen SM4 includes five items ("login to administrator menu," "network setting," "communication setting," "device setting," and "user setting").

As illustrated in FIG. 13A, each manual screen SM includes a menu button BMN2. Then, when the user operates the menu button BMN2, as illustrated in FIG. 13B, a menu MN2 is displayed so as to overlap the manual screen SM. This menu MN 2 includes a language selection menu ML. The language selection menu ML is for selecting a language for the manual page MP to be displayed, and in this example, is configured to allow selecting one of five languages (English, Japanese, French, German, and Portuguese). In the example of FIG. 13B, Japanese is selected in the language selection menu ML corresponding to that the manual page MP4 is written in Japanese. For example, when English is selected in the language selection menu ML, as illustrated in FIG. 13C, the manual screen SM5 is displayed. The manual screen SM5 is a screen when a manual page MP5 in which information about the administrator menu is written in English is displayed.

In this way, in the information processing system 3, the manual pages MP written in multiple languages can be viewed. These manual pages MP are each associated with a URL. In this example, as illustrated in FIGS. 13A-13C, the URLs each contain a language identifier IDL. For example, a Japanese manual page MP is associated with a URL including a language identifier IDL of "jpn," and an English manual page MP is associated with a URL including a language identifier IDL of "enu." Specifically, the manual page MP4 (FIG. 13A) in which the information about the administrator menu is written in Japanese is associated with "http://xxxx/001/jpn/adminmenu.html," and the manual page MP5 (FIG. 13C) in which the information about the administrator menu is written in English is associated with "http://xxxx/001/enu/adminmenu.html." In this way, the URLs of the manual pages MP of the same contents written in different languages are the same except for the language identifiers IDL. As a result, in the information processing system 3, the language of a manual page MP to be displayed can be selected using the URL.

Further, in the information processing system 3, as will be described later, when the operation screen SO displayed on the image processing apparatus 90 is synchronized with the manual page MP displayed by the mobile terminal 70, by supplying the language identifier IDL to the image processing apparatus 90, the operation screen SO written in the language corresponding to the language identifier IDL can be temporarily displayed on the image processing apparatus 90.

(Mobile Terminal 70)

Figure 14:
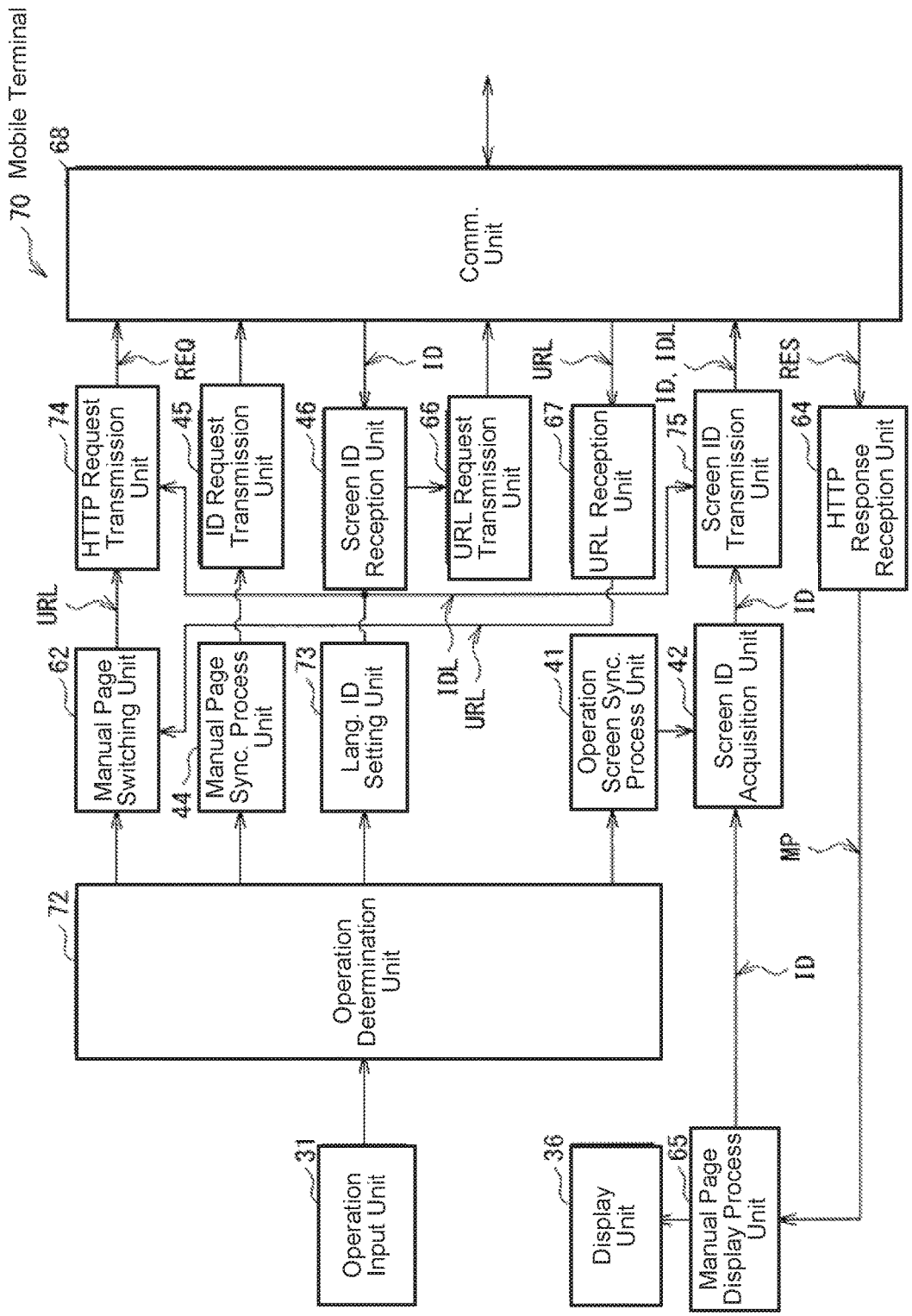
FIG. 14 is a block diagram illustrating a configuration example of the mobile terminal according to the third embodiment.

FIG. 14 illustrates a configuration example of the mobile terminal 70. The mobile terminal 70 includes an operation determination unit 72, a language identifier setting unit 73, a HTTP request transmission unit 74, and a screen identifier transmission unit 75.

The operation determination unit 72 performs the same operation as the operation determination unit 32 (FIG. 9) according to the second embodiment. Further, in the case where the user operates the language selection menu ML of the menu MN2, the operation determination unit 72 also has a function of instructing the language identifier setting unit 73 to set the language identifier IDL corresponding to the language selected by the user.

The language identifier setting unit 73 sets the language identifier IDL corresponding to the language used in the mobile terminal 70. Further, the language identifier setting unit 73 also has a function of setting the language identifier IDL corresponding to the language selected by the user based on the instruction from the operation determination unit 72. Then, the language identifier setting unit 73 supplies the set language identifier IDL to the HTTP request transmission unit 74 and the screen identifier transmission unit 75.

The HTTP request transmission unit 74 replaces the language identifier IDL included in the URL supplied from the manual page switching unit 62 with the language identifier IDL supplied from the language identifier setting unit 73, and generates an HTTP request REQ including the URL in which the language identifier IDL has been replaced. Then, the HTTP request transmission unit 74 transmits the generated HTTP request REQ to the server 80 via the communication unit 68.

The screen identifier transmission unit 75 transmits the screen identifier ID supplied from the screen identifier acquisition unit 42, together with the language identifier IDL supplied from the language identifier setting unit 73, to the image processing apparatus 90 via the communication unit 68.

(Server 80)

As illustrated in FIG. 10, the server 80 includes an operation manual storage unit 83. The operation manual storage unit 83 stores the operation manual MAN2 of the image processing apparatus 90. As described above, in addition to the Japanese operation manual, the operation manual MAN2 includes operation manuals written in multiple languages. The manual pages MP are each associated with a URL including a language identifier IDL. The URLs of the manual pages MP of the same contents written in different languages are the same except for the language identifiers IDL.

(Image Processing Apparatus 90)

Figure 15:
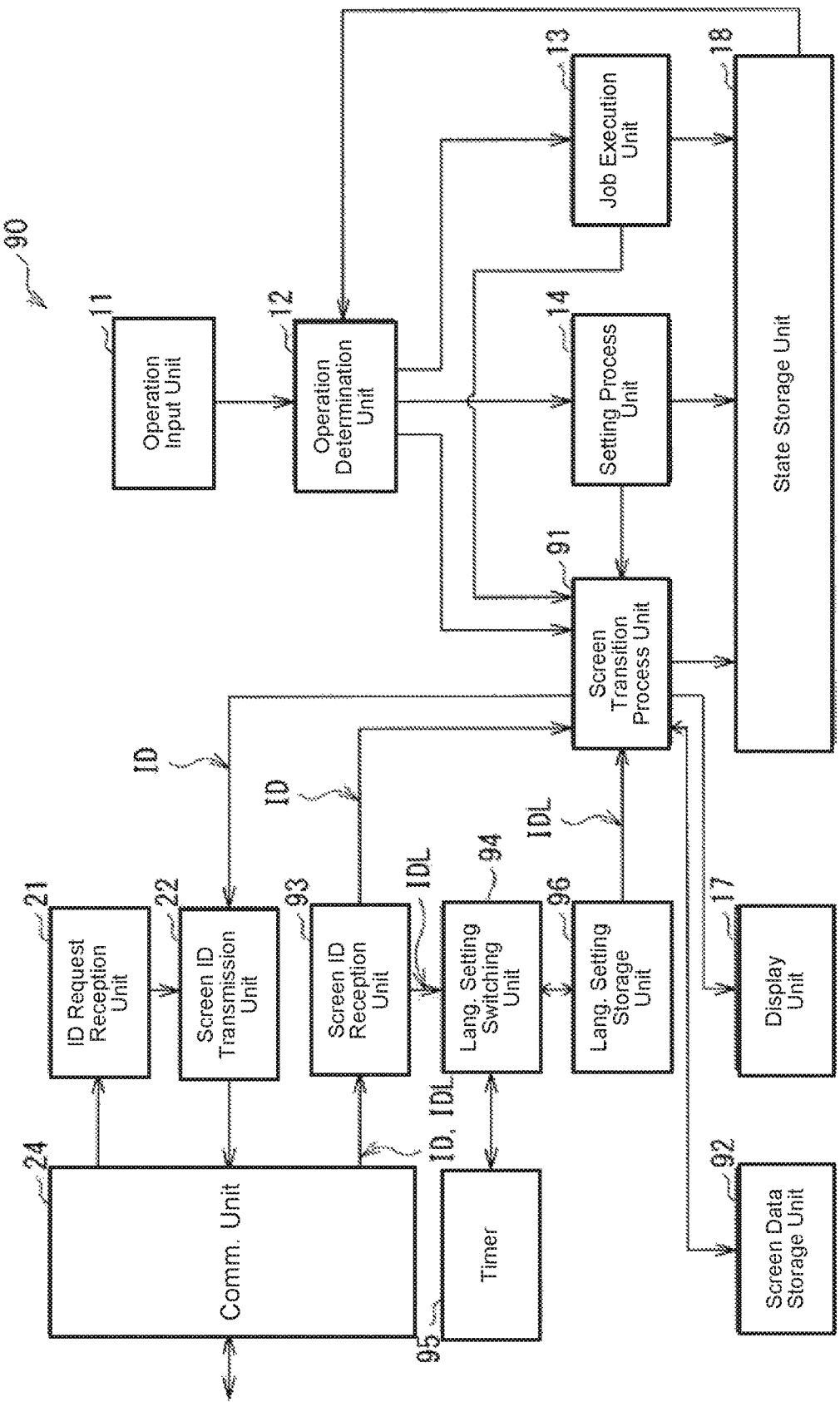
FIG. 15 is a block diagram illustrating a configuration example of an image processing apparatus according to the third embodiment.

FIG. 15 illustrates a configuration example of the image processing apparatus 90. The image processing apparatus 90 includes a screen transition process unit 91, a screen data storage unit 92, a screen identifier reception unit 93, a language setting switching unit 94, a timer 95, and a language setting storage unit 96.

Based on instruction from the operation determination unit 12, the job execution unit 13 and the setting process unit 14 and the language identifier IDL according to the current language setting LG supplied from the language setting storage unit 96, the screen transition process unit 91 transitions the operation screen SO displayed in the display unit 17 using the multiple operation screens SO stored in the screen data storage unit 92. Further, based on the screen identifier ID supplied from the screen identifier reception unit 93 and the language identifier IDL according to the current language setting LG supplied from the language setting storage unit 96, the screen transition process unit 91 selects, from the multiple operation screens SO stored in the screen data storage unit 92, an operation screen SO corresponding to the screen identifier ID and the language identifier IDL. Then, the screen transition process unit 91 also has a function of transitioning the operation screen SO displayed in the display unit 17 from the currently displayed operation screen SO to the selected operation screen SO.

In addition to the operation screen SO written in Japanese, the screen data storage unit 92 stores operation screens SO written in multiple languages. The screen data storage unit 92 stores these multiple operation screens SO together with corresponding screen identifiers ID and language identifiers IDL. The screen identifiers ID of the operation screens SO having the same content written in different languages are the same as each other.

The screen identifier reception unit 93 receives the screen identifier ID and the language identifier IDL transmitted from the mobile terminal 70 via the communication unit 24. Then, the screen identifier reception unit 93 supplies the screen identifier ID to the screen transition process unit 91 and supplies the language identifier IDL to the language setting switching unit 94.

Based on the language identifier IDL supplied from the screen identifier reception unit 93, the language setting switching unit 94 controls operation of the timer 95 to temporarily switch the current language setting LG stored in the language setting storage unit 96. The timer 95 performs timer operation based on an instruction from the language setting switching unit 94. The language setting storage unit 96 stores the current language setting LG and saved language settings LG1 (described below). Then the language setting storage unit 96 supplies the language identifier IDL according to the current language setting LG to the screen transition process unit 91.

Here, the screen identifier transmission unit 75, the screen identifier reception unit 46 and the communication unit 68 correspond to a specific example of a "first communication unit" in the present invention.

(Case C1)

Figure 16:
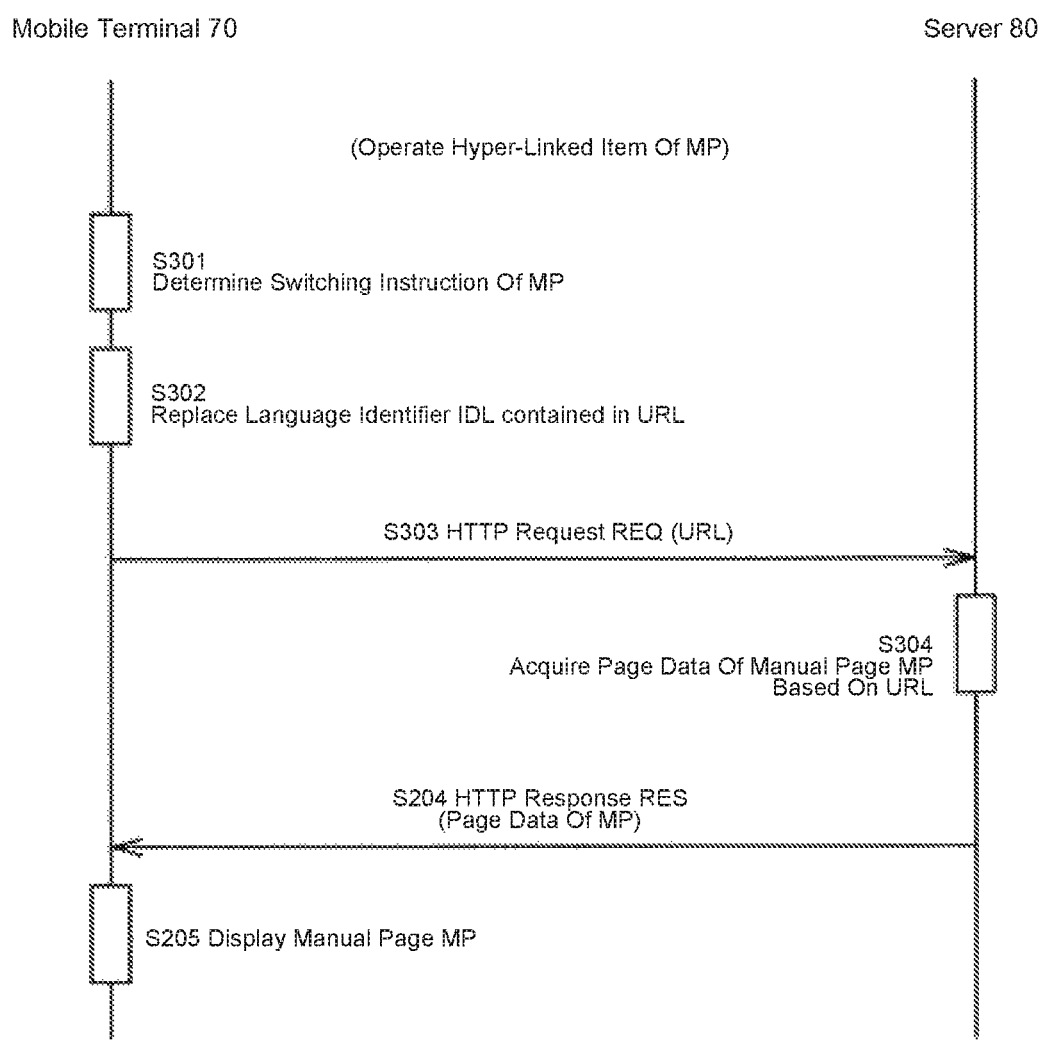
FIG. 16 is a sequence diagram illustrating an operation example of an information processing system according to the third embodiment.

FIG. 16 illustrates an operation example of the information processing system 3 in the case where the user operates a hyperlinked item on the manual page MP. When the user operates a hyperlinked item, the operation determination unit 72 of the mobile terminal 70 determines that the user operation is an instruction to switch the manual page MP (step S301). Then, based on an instruction from the operation determination unit 72, the manual page switching unit 62 supplies the URL of the link destination of the hyperlink to the HTTP request transmission unit 74.

Next, the HTTP request transmission unit 74 replaces the language identifier IDL included in the URL supplied from the manual page switching unit 62 with the language identifier IDL supplied from the language identifier setting unit 73 (step S302).

Next, the HTTP request transmission unit 74 generates a HTTP request REQ including the URL in which the language identifier IDL has been replaced, and transmits the generated HTTP request REQ to the server 80 (step S303). The reception determination unit 51 of the server 80 receives the HTTP request REQ and supplies the URL included in the HTTP request REQ to the manual page acquisition unit 52.

Next, based on the URL supplied from the reception determination unit 51, the manual page acquisition unit 52 of the server 80 acquires the page data of the manual page MP corresponding to the URL from the operation manual storage unit 83 (step S303). In this example, since the URL includes the language identifier IDL, based on the URL, the manual page acquisition unit 52 can acquire the page data of the manual page MP written in the language corresponding to the language identifier IDL. The subsequent operation is the same as the information processing system 2 (FIG. 11) according to the second embodiment.

In this way, in the information processing system 3, the HTTP request REQ is generated based on the language identifier IDL supplied from the language identifier setting unit 73. Therefore, manual pages MP written in various languages can be easily displayed. As a result, in the information processing system 3, user convenience can be improved.

(Case C2)

Figure 17:
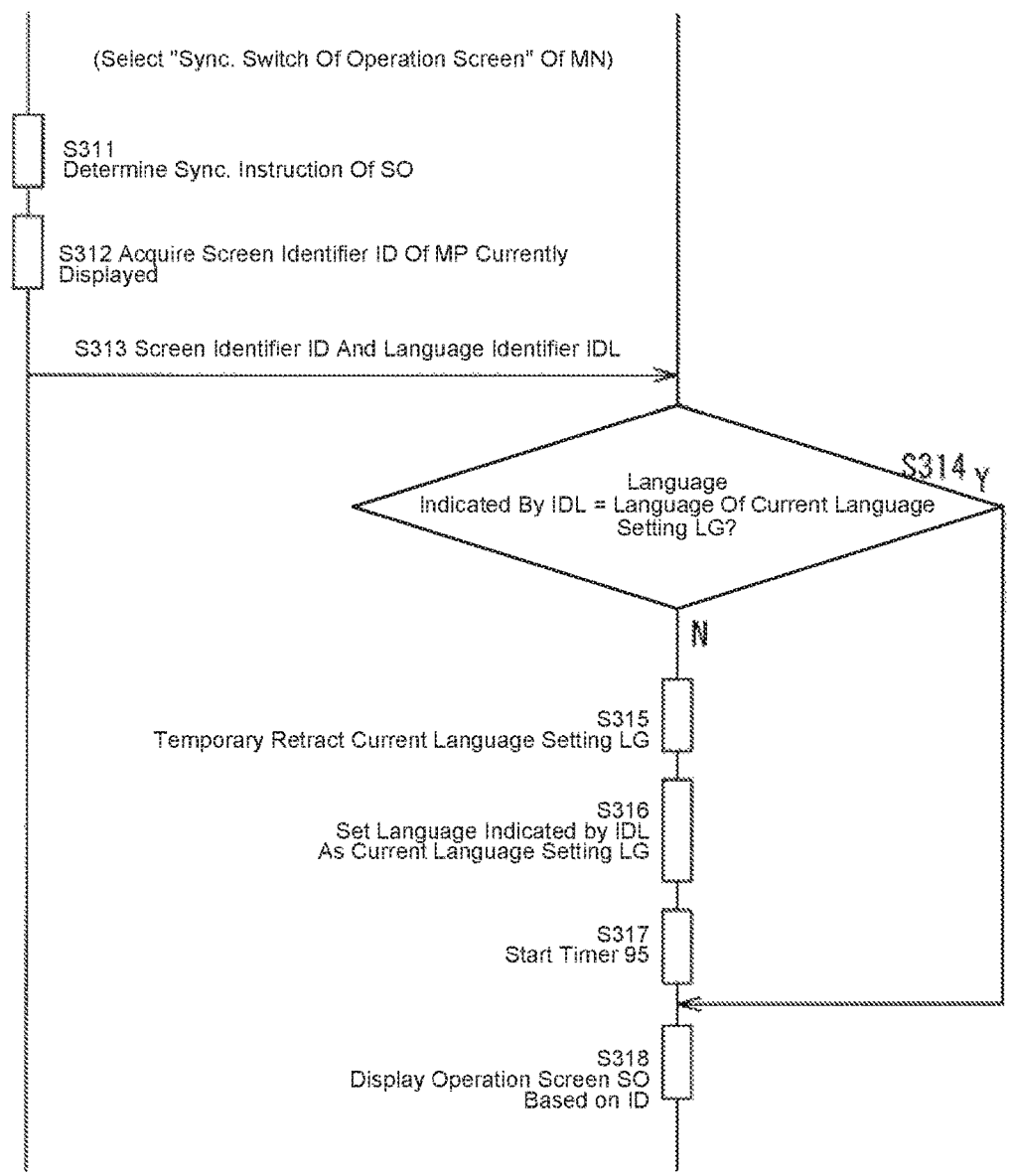
FIG. 17 is a sequence diagram illustrating another operation example of the information processing system according to the third embodiment.

FIG. 17 illustrates an operation example of the information processing system 3 in the case where the user selects the "Sync. Switch Of Operation Screen" of the menu MN. In a case where the display unit 36 of the mobile terminal 70 displays a manual page MP, when the user selects the "Sync. Switch Of Operation Screen" of the menu MN, the operation determination unit 72 of the mobile terminal 70 determines that the user operation is an instruction to synchronize the operation screen SO with the manual page MP (step S311). Then, the operation determination unit 72 issues an instruction to the operation screen synchronization process unit 41.

Next, based on an instruction from the operation screen synchronization process unit 41, the screen identifier acquisition unit 42 acquires the screen identifier ID of the manual page MP currently displayed by the display unit 36 (step S312) and supplies the screen identifier ID to the screen identifier transmission unit 75.

Next, the screen identifier transmission unit 75 transmits the screen identifier ID, together with the language identifier IDL supplied from the language identifier setting unit 73, to the image processing apparatus 90 (step S313). Then, the screen identifier reception unit 93 of the image processing apparatus 90 receives the screen identifier ID and the language identifier IDL transmitted from the mobile terminal 70, and supplies the received screen identifier ID to the screen transition process unit 91 and supplies the received language identifier IDL to the language setting switching unit 94.

Next, the language setting switching unit 94 of the image processing apparatus 90 determines whether or not the language indicated by the language identifier IDL supplied from the screen identifier reception unit 93 is the same as the language indicated by the current language setting LG stored in the language setting storage unit 96 (step S314). When the languages are the same language ("Y" in step S314), the process proceeds to step S318.

In step S314, when the languages are different languages ("N" in step S314), the language setting switching unit 94 temporarily saves the current language setting LG stored in the language setting storage unit 96 as the language setting LG1 (step S315). The language setting storage unit 96 temporarily stores the language setting LG1. Then, the language setting switching unit 94 sets the language indicated by the language identifier IDL as the current language setting LG (step S316). The language setting storage unit 96 stores the current language setting LG and supplies the language identifier IDL according to the current language setting LG to the screen transition process unit 91. Then, the language setting switching unit 94 starts the timer 95 (step S317).

Then, the screen transition process unit 91 and the display unit 17 of the image processing apparatus 90 display an operation screen SO based on the screen identifier ID and the language identifier IDL (step S318). Specifically, the screen transition process unit 91 selects, from the multiple operation screens SO stored in the screen data storage unit 92, an operation screen SO corresponding to the screen identifier ID supplied from screen identifier reception unit 93 and the language identifier IDL supplied from the language setting storage unit 96, and supplies the selected operation screen SO to the display unit 17. Then, the display unit 17 displays the operation screen SO.

As a result, this sequence is terminated.

Figure 18:
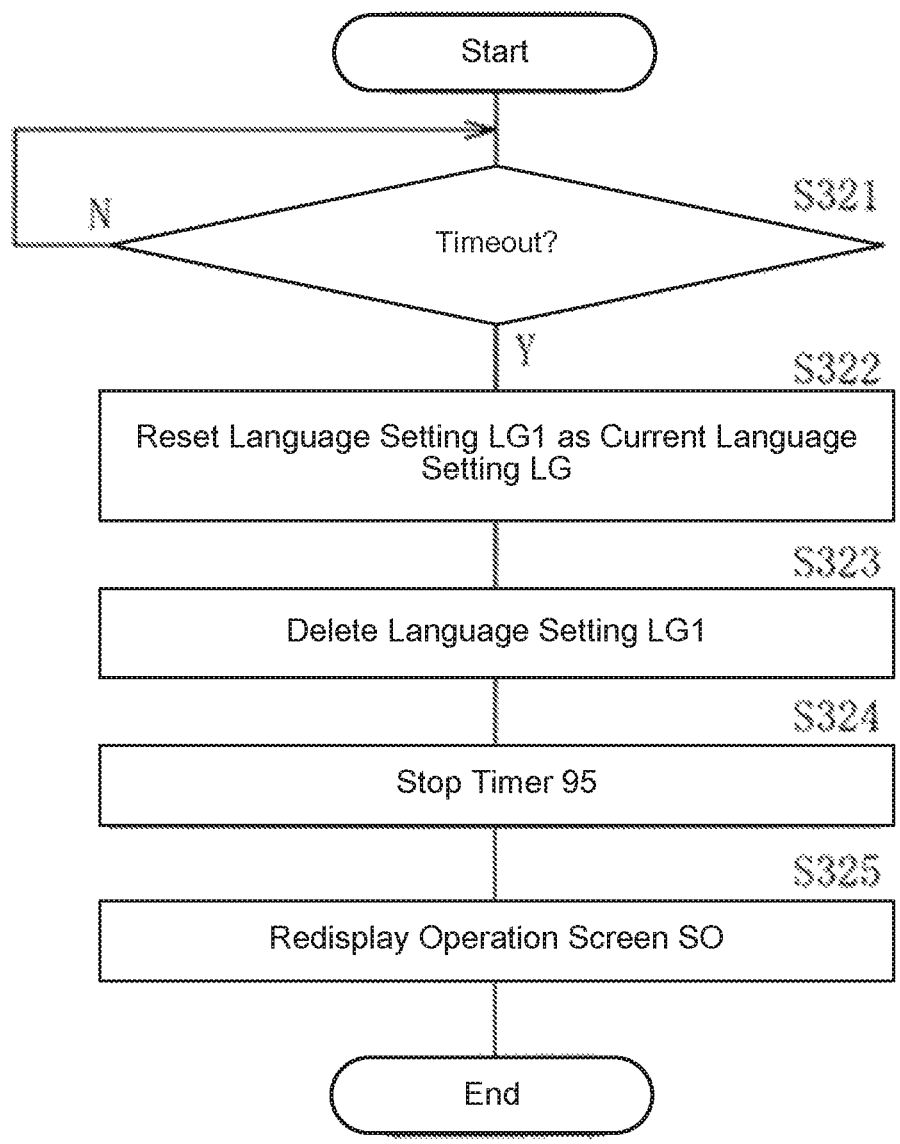
FIG. 18 is a flowchart illustrating another operation example of the information processing system according to the third embodiment.

FIG. 18 illustrates an operation example of the image processing apparatus 90 after the sequence illustrated in FIG. 17 in the case where, in step S314 of FIG. 17, the language indicated by the language identifier IDL is different from the language indicated by the current language setting LG stored in the language setting storage unit 96 ("N" in step S314). The language setting switching unit 94 confirms whether or not the timer 95 has timed out (step S321), and, when the timer 95 has timed out ("Y" in step S321), resets the saved language setting LG1 stored in the language setting storage unit 96 as the current language setting LG (step S322). The language setting storage unit 96 stores the reset current language setting LG and supplies the language identifier IDL according to the current language setting LG to the screen transition process unit 91. Next, the language setting switching unit 94 deletes the saved language setting LG1 stored in the language setting storage unit 96 (step S323), and stops the timer 95 (step S324) and resets the timer 95. Then, the screen transition process unit 91 and the display unit 17 of the image processing apparatus 90 re-display an operation screen SO based on the screen identifier ID and the language identifier IDL corresponding to the reset current language setting LG (step S325).

In this way, in the information processing system 3, when the operation screen SO displayed on the image processing apparatus 90 is synchronized with the manual page MP displayed by the mobile terminal 70, in addition to the screen identifier ID, the language identifier IDL is supplied to the image processing apparatus 90. As a result, for example, in an office in Japan, a user U1 whose mother tongue is English can easily cause an English operation screen SO to be displayed on the image processing apparatus 90 by synchronizing the operation screen SO of the image processing apparatus 90 with the manual page MP displayed by the mobile terminal 70 of the user U1. As a result, in the information processing system 3, user convenience can be improved.

Further, in the information processing system 3, after a predetermined time has elapsed, the saved language setting LG1 is reset as the current language setting LG. As a result, for example, in the office in Japan, after the user U1 finishes using the image processing apparatus 90, the language setting can be automatically returned to the Japanese setting. Therefore, thereafter, when a user U2 whose mother tongue is Japanese uses the image processing apparatus 90, the Japanese operation screen SO is displayed. Therefore, user convenience can be enhanced.

(Case C3)

Figure 19:
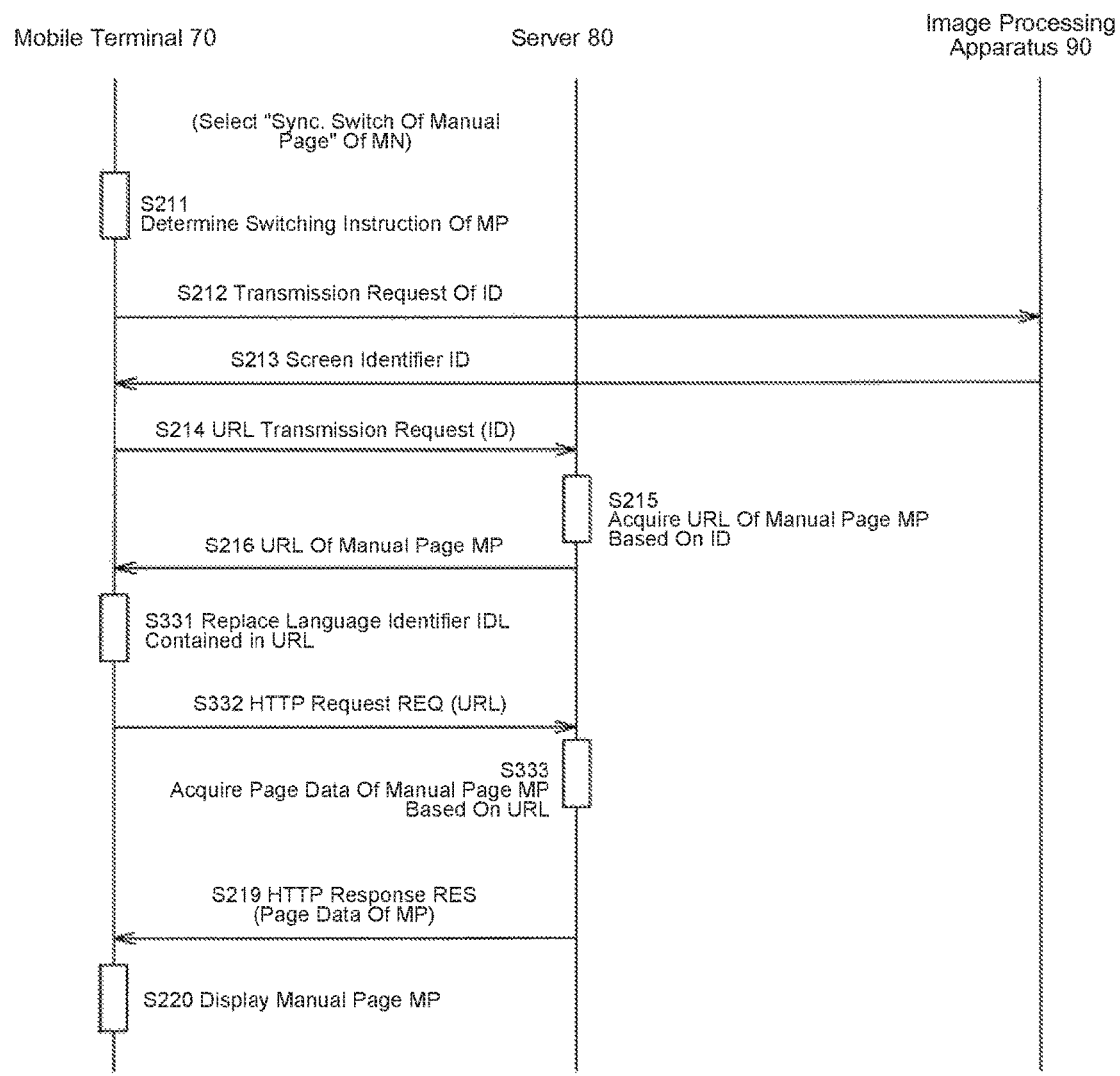
FIG. 19 is a sequence diagram illustrating another operation example of the information processing system according to the third embodiment.

FIG. 19 illustrates an operation example of the information processing system 3 in the case where the user selects the "Sync. Switch Of Manual Page" of the menu MN. This operation is the same as that of the information processing system 2 (FIG. 12) according to the second embodiment until step S216 in which the mobile terminal 70 acquires the URL from the server 80. Then the manual page switching unit 62 of the mobile terminal 70 supplies the URL of the manual page MP received by the URL reception unit 67 in step S216 to the HTTP request transmission unit 74.

Next, the HTTP request transmission unit 74 replaces the language identifier IDL included in the URL supplied from the manual page switching unit 62 with the language identifier IDL supplied from the language identifier setting unit 73 (step S331).

Next, the HTTP request transmission unit 74 generates a HTTP request REQ including the URL in which the language identifier IDL has been replaced, and transmits the generated HTTP request REQ to the server 80 (step S332). The reception determination unit 51 of the server 80 receives the HTTP request REQ and supplies the URL included in the HTTP request REQ to the manual page acquisition unit 52.

Next, based on the URL supplied from the reception determination unit 51, the manual page acquisition unit 52 of the server 80 acquires the page data of the manual page MP corresponding to the URL from the operation manual storage unit 83 (step S333). In this example, since the URL includes the language identifier IDL, based on the URL, the manual page acquisition unit 52 can acquire the page data of the manual page MP written in the language corresponding to the language identifier IDL. The subsequent operation is the same as the information processing system 2 (FIG. 12) according to the second embodiment.

In the present embodiment, the HTTP request is generated based on the language identifier supplied from the language identifier setting unit. Therefore, user convenience can be improved.

Further, in the present embodiment, when the operation screen displayed on the image processing apparatus is synchronized with the manual page displayed by the mobile terminal, in addition to the screen identifier, the language identifier is also supplied to the image processing apparatus. Therefore, user convenience can be improved.

Further, in the present embodiment, after a predetermined time has elapsed, the saved language setting is reset as the current language setting. Therefore, user convenience can be improved. The other effects are the same as in the second embodiment.

4. Fourth Embodiment

Next, an information processing system 4 according to a fourth embodiment is described. In the present embodiment, a synchronous operation is controlled according to whether or not authentication is necessary in the image processing apparatus. A configuration component that is substantially the same as in the information processing system 2 according to the above second embodiment is indicated using the reference numeral symbol, and description thereof is omitted as appropriate. As illustrated in FIG. 8, the information processing system 4 includes an image processing apparatus 120, the access point 9, a mobile terminal 110, and the server 50.

Figure 20:
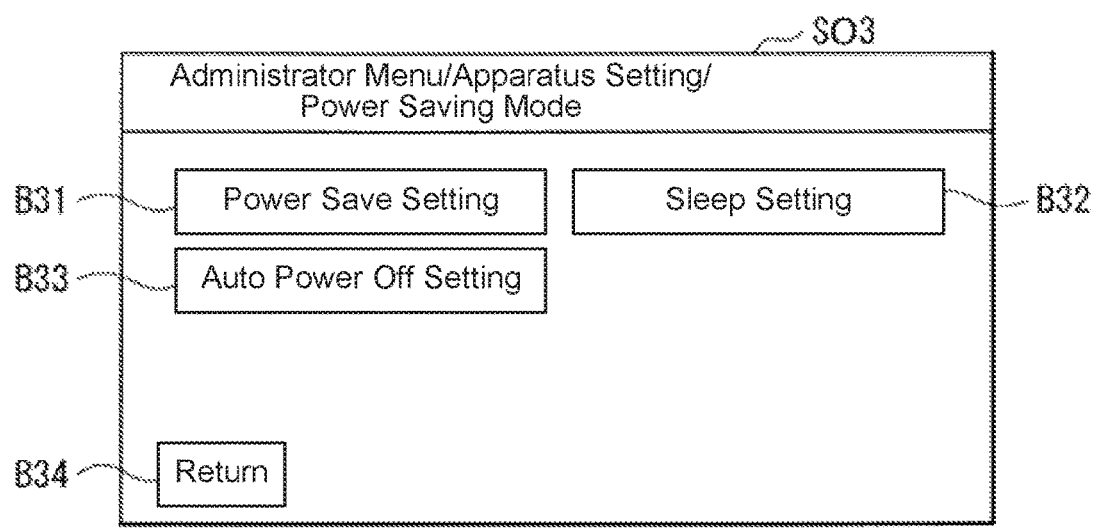
FIG. 20 is an explanatory diagram illustrating an example of an operation screen displayed on an image processing apparatus according to a fourth embodiment.

FIG. 20 illustrates an example of an operation screen SO (operation screen SO3) displayed on the image processing apparatus 120. The operation screen SO3 is a screen displaying a power saving mode of an administrator menu, and in this example, includes a "power save setting" button B31, a "sleep setting" button B32, an "Auto Power Off setting" button B33 and a "return" button B34. In the image processing apparatus 120, for example, when a user operates the "power save setting" button B31, a sub menu for performing power saving setting is displayed.

The image processing apparatus 120 displays an operation screen SO about the administrator menu such as the operation screen SO3, for example, only when authentication is successful by entering an administrator password. As a result, in the image processing apparatus 120, a general user other than an administrator cannot easily change the settings of the image processing apparatus 120.

In the image processing apparatus 120, each operation screen SO is associated with an authentication necessity flag F indicating whether or not authentication is necessary when a user operates the operation screen SO. Based on the authentication necessity flag F, the image processing apparatus 120 can determine whether or not authentication is necessary.

FIGS. 21A-21C illustrate examples of manual screens SM (manual screens SM6-SM8) displayed on the mobile terminal 110. The manual screen SM6 (FIG. 21A) is a screen when a manual page MP6 in which information about an administrator menu is described is displayed. The manual screen SM6 includes five items ("login to administrator menu," "network setting," "communication setting," "device setting," and "user setting"). Hyperlinks are set for these five items. For example, when the user operates an item about "device setting," the mobile terminal 110 displays the manual screen SM7 (FIG. 21B). The manual screen SM7 is a screen when a manual page MP7 in which information about device setting in the administrator menu is described is displayed. The manual screen SM7 includes four items ("system setting," "volume setting," "power saving mode" and "language setting"). Hyperlinks are similarly set for these four items. For example, when the user operates an item about "power saving mode," the mobile terminal 110 displays the manual screen SM8 (FIG. 21C). The manual screen SM8 is a screen when a manual page MP8 in which information about the power saving mode is described is displayed. Further, each manual screen SM includes a menu button BMN.

By operating the mobile terminal 110, the user can freely view the manual pages MP related to the administrator menu, such as the manual pages MP6-MP8. That is, for example, a general user cannot cause an operation screen SO (for example, the operation screen SO3 (FIG. 20)) about the administrator menu to be displayed on the image processing apparatus 120, but can view a manual page MP (for example, the manual page MP8 (FIG. 21C)) about the administrator menu. As a result, the user can know various functions of the image processing apparatus 120, including setting items that, for example, can only be set by an administrator.

(Mobile Terminal 110)

Figure 22:
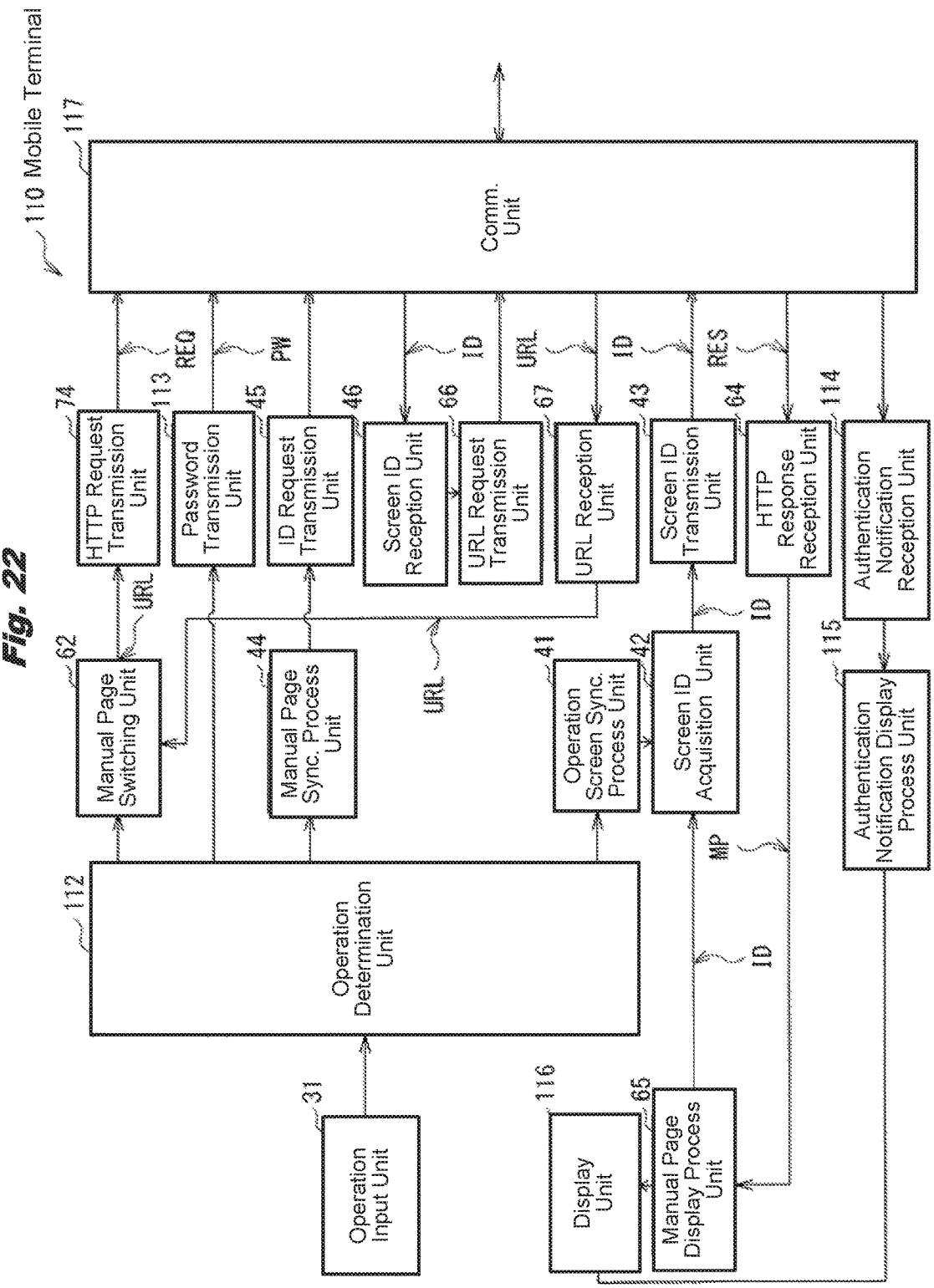
FIG. 22 is a block diagram illustrating a configuration example of the mobile terminal according to the fourth embodiment.

FIG. 22 illustrates a configuration example of the mobile terminal 110. The mobile terminal 110 includes an operation determination unit 112, a password transmission unit 113, an authentication notification reception unit 114, an authentication notification display process unit 115, a display unit 116, and a communication unit 117.

The operation determination unit 112 performs the same operation as the operation determination unit 32 (FIG. 9) according to the second embodiment. Further, when the display unit 116 displays an administrator authentication screen prompting a user to input an administrator password PW, the operation determination unit 112 also has a function of supplying a password PW input by the user in a password input field of the administrator authentication screen to the password transmission unit 113.

The password transmission unit 113 transmits the password PW supplied from the operation determination unit 112 to the image processing apparatus 120 via the communication unit 117.

The authentication notification reception unit 114 receives an authentication notification indicating that authentication is necessary in the image processing apparatus 120, and an authentication failure notification indicating that authentication has failed in the image processing apparatus 120, from the image processing apparatus 120 via the communication unit 117. Then, the authentication notification reception unit 114 supplies these notifications to the authentication notification display process unit 115.

When an authentication notification is received, the authentication notification display process unit 115 instructs the display unit 116 to display the administrator authentication screen. Further, the authentication notification display process unit 115 also has a function of instructing the display unit 116 to display that authentication has failed when an authentication failure notification is received.

The display unit 116 displays the manual page MP based on the page data of the manual page MP supplied from the manual page display process unit 65. Further, the display unit 116 also has a function of displaying the administrator authentication screen prompting the user to input an administrator password PW or displaying an authentication result based on an instruction from the authentication notification display process unit 115.

The communication unit 117 communicates with the image processing apparatus 120 and the server 50.

(Image Processing Apparatus 120)

Figure 23:
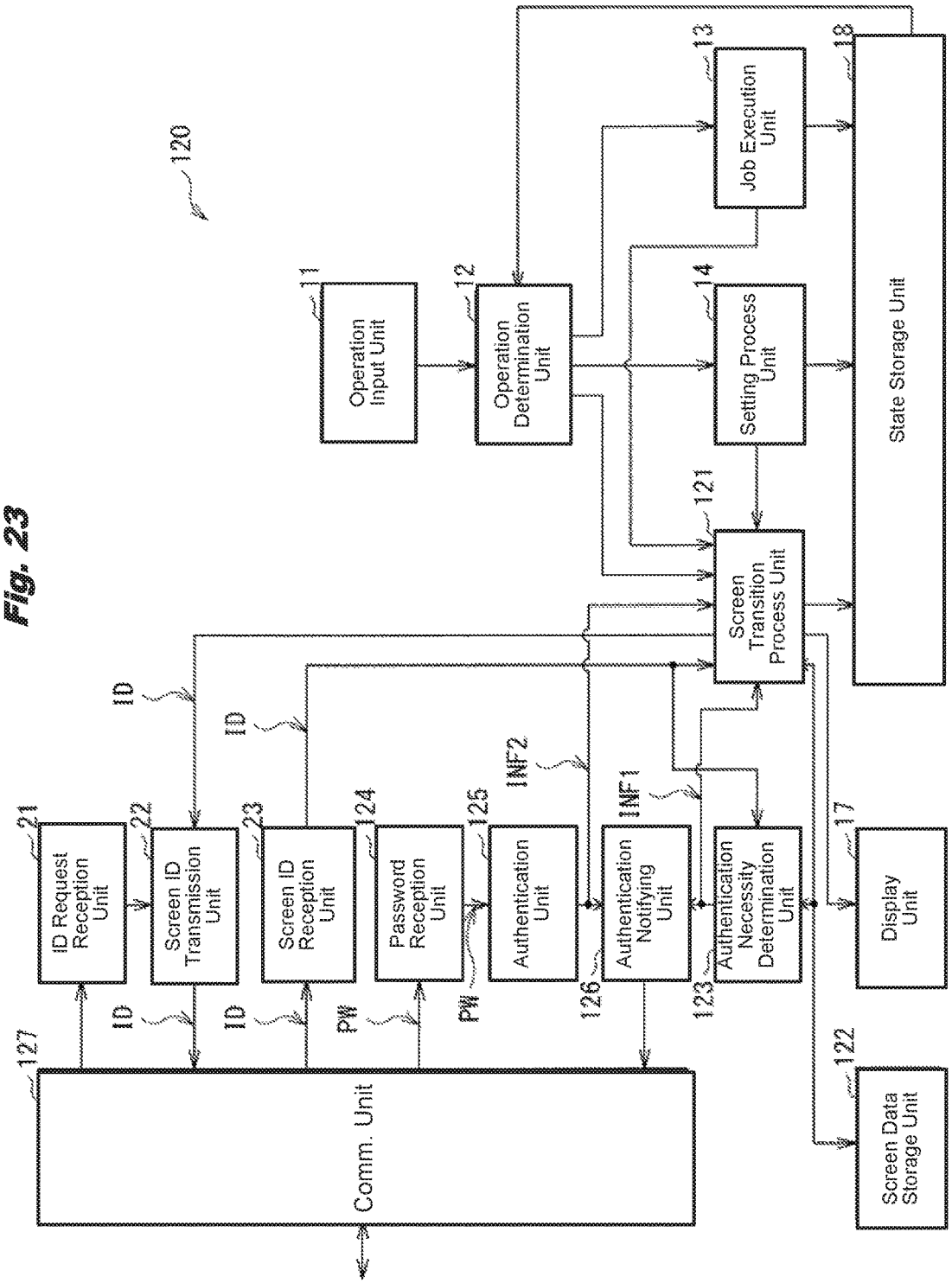
FIG. 23 is a block diagram illustrating a configuration example of an image processing apparatus according to the fourth embodiment.

FIG. 23 illustrates a configuration example of the image processing apparatus 120. The image processing apparatus 120 includes a screen data storage unit 122, an authentication necessity determination unit 123, a password reception unit 124, an authentication unit 125, a screen transition process unit 121, an authentication notifying unit 126, and a communication unit 127.

The screen data storage unit 122 stores multiple operation screens SO to be displayed in the display unit 17 of the image processing apparatus 120 together with corresponding screen identifiers ID and corresponding authentication necessity flags F.

Based on a screen identifier ID supplied from the screen identifier reception unit 23, the authentication necessity determination unit 123 determines whether or not authentication is necessary when an operation screen SO corresponding to the screen identifier ID is operated. Specifically, the authentication necessity determination unit 123 acquires, based on a screen identifier ID, an authentication necessity flag F corresponding to the screen identifier ID using data stored in the screen data storage unit 122, and determines whether or not authentication is necessary based on the authentication necessity flag F. Then, the authentication necessity determination unit 123 supplies authentication necessity information INF1 indicating whether or not authentication is necessary to the screen transition process unit 121 and the authentication notifying unit 126.

The password reception unit 124 receives the password PW transmitted from the mobile terminal 110 via the communication unit 127. Then, the password reception unit 124 supplies the received password PW to the authentication unit 125. The authentication unit 125 performs authentication processing based on the password PW supplied from the password reception unit 124. Then, the authentication unit 125 supplies authentication result information INF2 indicating whether or not authentication has succeeded to the screen transition process unit 121 and the authentication notifying unit 126.

The screen transition process unit 121 performs the same operation as the screen transition process unit 15 according to the second embodiment. When the authentication necessity information INF1 supplied from the authentication necessity determination unit 123 indicates that authentication is unnecessary, based on the screen identifier ID supplied from the screen identifier reception unit 23, the screen transition process unit 121 switches the operation screen SO displayed in the display unit 17 to the operation screen SO corresponding to the screen identifier ID. Further, when the authentication result information INF2 supplied from the authentication unit 125 indicates that the authentication has succeeded, based on the screen identifier ID supplied from the screen identifier reception unit 23, the screen transition process unit 121 switches the operation screen SO displayed in the display unit 17 to the operation screen SO corresponding to the screen identifier ID.

When the authentication necessity information INF1 supplied from the authentication necessity determination unit 123 indicates that authentication is necessary, the authentication notifying unit 126 transmits an authentication notification to the mobile terminal 110 via the communication unit 127. Further, when the authentication result information INF2 supplied from the authentication unit 125 indicates that the authentication has failed, the authentication notifying unit 126 also has a function of transmitting an authentication failure notification to the mobile terminal 110 via the communication unit 127.

The communication unit 127 communicates with the mobile terminal 110.

Here, the screen identifier transmission unit 43, the screen identifier reception unit 46, the authentication notification reception unit 114, the password transmission unit 113 and the communication unit 117 correspond to a specific example of a "first communication unit" in the present invention.

(Case C1) In the case where the user operates a hyperlinked item on the manual page MP, the information processing system 4 performs the same operation as the information processing system 2 (FIG. 11) according to the second embodiment.

(Case C2)

Figure 24:
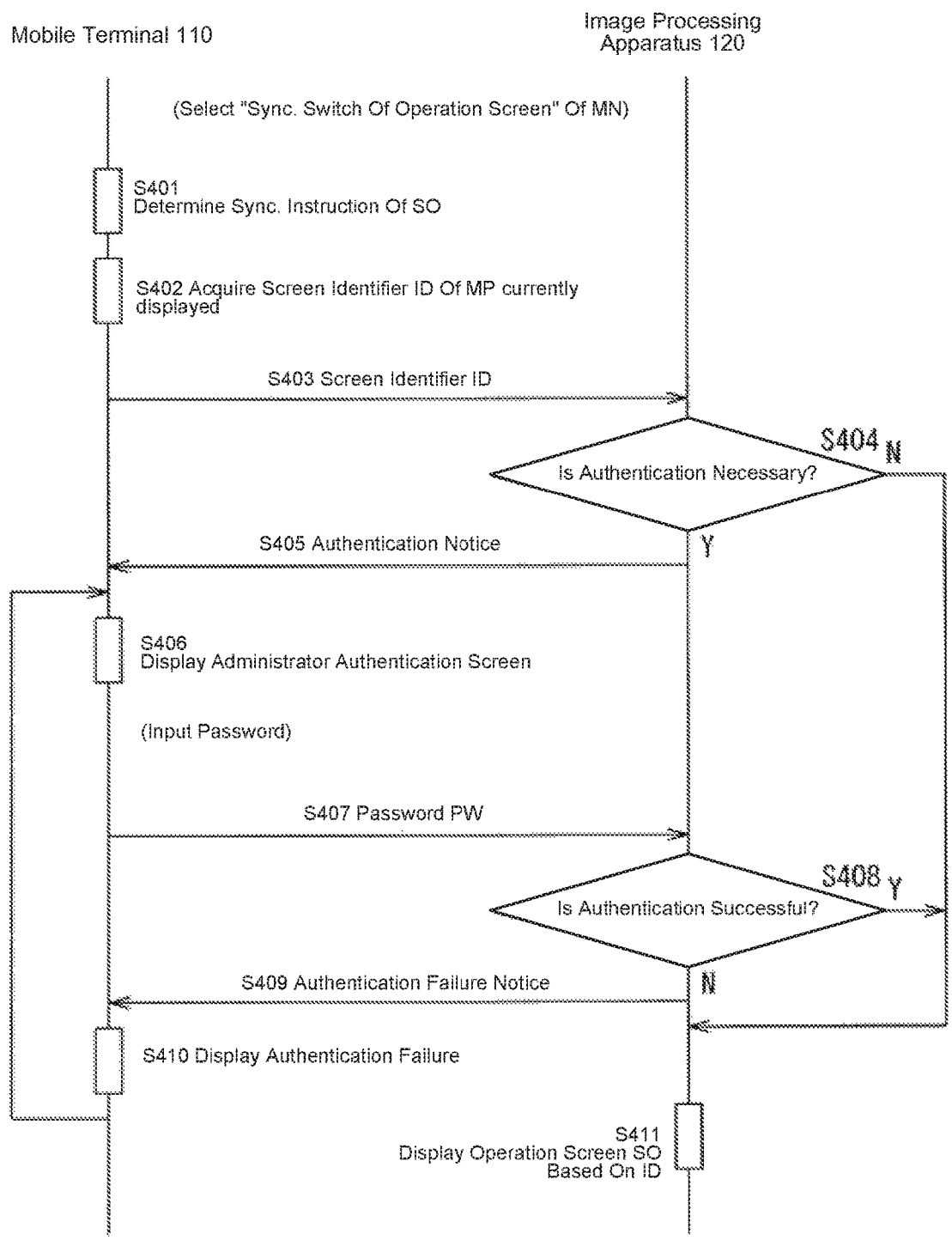
FIG. 24 is a sequence diagram illustrating an operation example of an information processing system according to the fourth embodiment.

FIG. 24 illustrates an operation example of the information processing system 4 in the case where the user selects the "Sync. Switch Of Operation Screen" of the menu MN. In a case where the display unit 116 of the mobile terminal 110 displays a manual page MP, when the user selects the "Sync. Switch Of Operation Screen" of the menu MN, the operation determination unit 112 of the mobile terminal 110 determines that the user operation is an instruction to synchronize the operation screen SO with the manual page MP (step S401). Then, the operation determination unit 112 issues an instruction to the operation screen synchronization process unit 41.

Next, the screen identifier acquisition unit 42 acquires the screen identifier ID of the manual page MP currently displayed by the display unit 116 (step S402), and supplies the screen identifier ID to the screen identifier transmission unit 43.

Next, the screen identifier transmission unit 43 transmits the screen identifier ID to the image processing apparatus 120 (step S403). The screen identifier reception unit 23 of the image processing apparatus 120 receives the screen identifier ID transmitted from the mobile terminal 110 and supplies the received screen identifier ID to the screen transition process unit 121 and the authentication necessity determination unit 123.

Next, the authentication necessity determination unit 123 confirms whether or not authentication is necessary based on the screen identifier ID (step S404). Specifically, the authentication necessity determination unit 123 acquires, based on a screen identifier ID, an authentication necessity flag F corresponding to the screen identifier ID using data stored in the screen data storage unit 122, and determines whether or not authentication is necessary based on the authentication necessity flag F. Then, the authentication necessity determination unit 123 supplies authentication necessity information INF1 indicating a result of the determination to the screen transition process unit 121 and the authentication notifying unit 126. When authentication is unnecessary ("N" in step S404), the process proceeds to step S411.

In step S404, when authentication is necessary ("Y" in step S404), the authentication notifying unit 126 transmits an authentication notification to the mobile terminal 110 (step S405). The authentication notification reception unit 114 of the mobile terminal 110 receives the authentication notification and supplies the received authentication notification to the authentication notification display process unit 115.

Next, based on the authentication notification, the authentication notification display process unit 115 and the display unit 116 of the mobile terminal 110 display an administrator authentication screen prompting the user to input an administrator password PW (step S406).

Next, when the user inputs the password PW in the password input field of the administrator authentication screen, the operation determination unit 112 supplies the password PW input by the user to the password transmission unit 113, and the password transmission unit 113 transmits the password PW to the image processing apparatus 120 via the communication unit 117 (step S407). The password reception unit 124 of the image processing apparatus 120 receives the password PW and supplies the received password PW to the authentication unit 125.

Next, the authentication unit 125 performs an authentication process based on the password PW supplied from the password reception unit 124 (step S408). Then, the authentication unit 125 supplies authentication result information INF2 indicating a result of the authentication to the screen transition process unit 121 and the authentication notifying unit 126. When the authentication is successful ("Y" in step S408), the process proceeds to step S411.

In step S408, when the authentication has failed ("N" in step S408), the authentication notifying unit 126 transmits an authentication failure notification to the mobile terminal 110 (step S409). The authentication notification reception unit 114 of the mobile terminal 110 receives the authentication failure notification and supplies the received authentication failure notification to the authentication notification display process unit 115.

Next, the authentication notification display process unit 115 and the display unit 116 of the mobile terminal 110 display a message indicating that the authentication has failed based on the authentication failure notification (step S410). Then, the process returns to step S406.

Then, the screen transition process unit 121 and the display unit 17 of the image processing apparatus 120 display the operation screen SO based on the screen identifier ID (step S411). That is, when authentication is unnecessary ("N" in step S404) or when authentication is successful ("Y" in step S408), the screen transition process unit 121 and the display unit 17 of the image processing apparatus 120 display the operation screen SO based on the screen identifier ID. In other words, when authentication has failed, the screen transition process unit 121 and the display unit 17 of the image processing apparatus 120 do not display the operation screen SO based on the screen identifier ID.

As a result, this sequence is terminated.

As described above, in information processing system 4, when authentication has failed, the operation screen SO displayed on the image processing apparatus 120 is not synchronized with the manual page MP displayed by the mobile terminal 110. As a result, in the information processing system 4, a general user cannot operate the administrator menu. Therefore, for example, a risk that the settings of the image processing apparatus 120 are inadvertently changed can be reduced. Therefore, user convenience can be improved.

(Case C3)

In the case where the user selects "Sync. Switch Of Manual Page" of the menu MN, the information processing system 4 performs the same operation as the information processing system 2 (FIG. 12) according to the second embodiment.

In the present embodiment, when the authentication has failed, the operation screen displayed on the image processing apparatus is not synchronized with the manual page displayed by the mobile terminal. Therefore, user convenience can be improved.

5. Fifth Embodiment

Next, an information processing system 5 according to a fifth embodiment is described. In the present embodiment, a synchronous operation is controlled according to an installation status of optional hardware in the image processing apparatus. A configuration component that is substantially the same as in the information processing system 2 according to the above second embodiment is indicated using the reference numeral symbol, and description thereof is omitted as appropriate. As illustrated in FIG. 8, the information processing system 5 includes an image processing apparatus 150, the access point 9, a mobile terminal 130, and a server 140.

The image processing apparatus 150 is configured such that optional hardware such as a hard disk, an expansion memory, various memory cards, and the like can be installed. It may be possible that, in an operation screen SO displayed on the image processing apparatus 150, there may be something that is user operable only when some optional hardware is installed. In the image processing apparatus 150, when such an operation screen SO is displayed, when the optional hardware is not installed, for example, a part related to a function of the optional hardware is displayed in gray and is not user operable. Alternatively, the image processing apparatus 150 does not display such an operation screen SO.

Even when some optional hardware is not installed, a user can operate the mobile terminal 130 to view a manual page MP about a function that cannot be executed when the optional hardware is not installed. As a result, for example, the user can know various functions of the image processing apparatus 150 including a function that cannot be executed unless some optional hardware is installed. When a function according to a displayed manual page MP cannot be executed because some optional hardware is not installed in the image processing apparatus 150, the mobile terminal 130 displays a warning message. As a result, in the information processing system 5, the user can know that the function according to the manual page MP being viewed cannot be executed.

In the information processing system 5, similar to the information processing system 2 according to the second embodiment, an operation manual MAN3 is stored in the server 140. A selector corresponding to some optional hardware is described in a manual page MP that describes a function that cannot be executed unless the optional hardware is installed, the manual page MP being among multiple manual pages MP included in the operation manual MAN3. Specifically, for example, in a manual page MP that describes a function that can be executed by installing a hard disk, the following selector is described.

.option-hardware-hdd[ ] Similarly, for example, in a manual page MP that describes a function that can be executed by installing an expansion memory, the following selector is described.

.option-hardware-ram[ ] In the information processing system 5, based on such selectors, it is possible to gain an understanding of which function described in a manual page MP displayed by the mobile terminal 130 can be executed by installing which optional hardware.

(Mobile Terminal 130)

Figure 25:
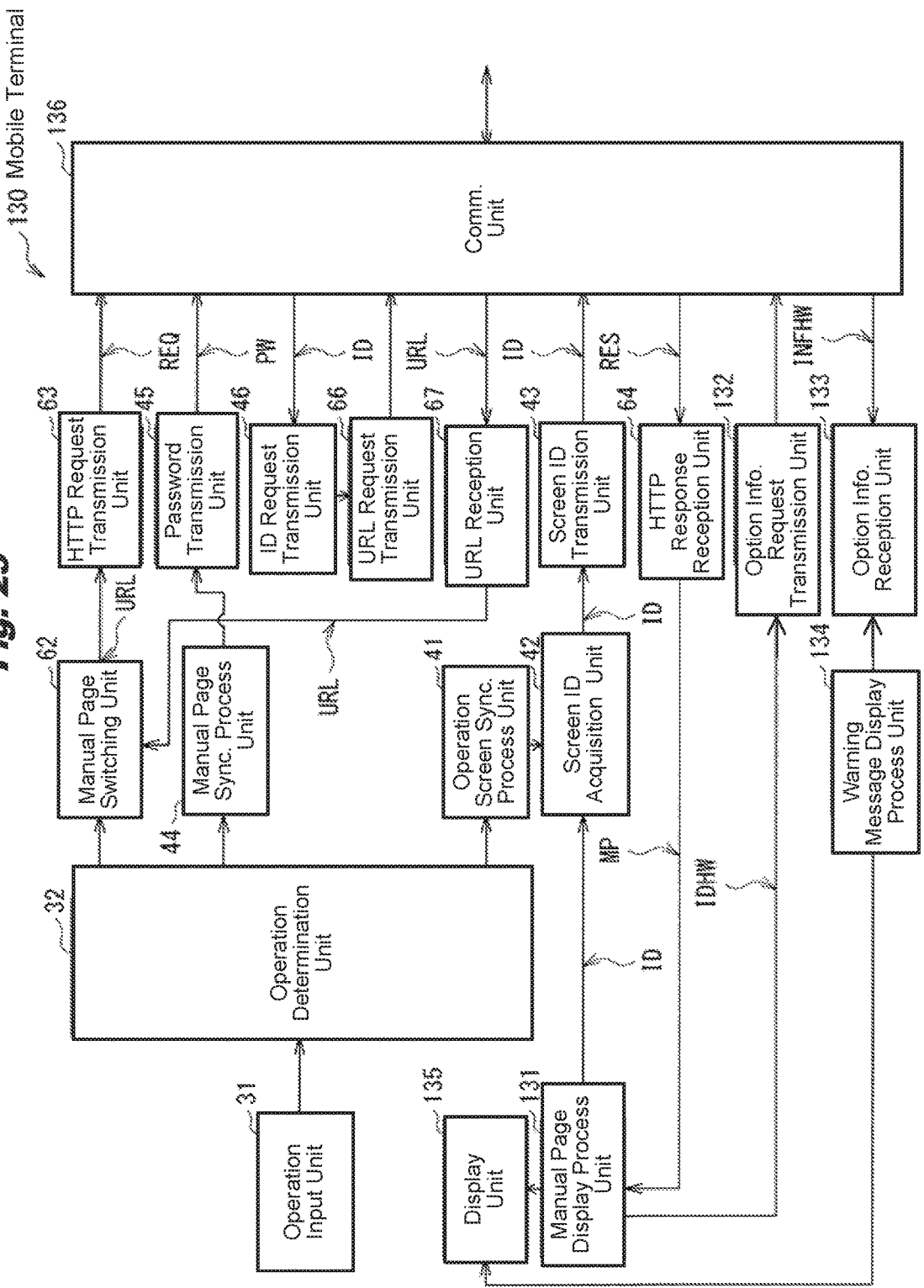
FIG. 25 is a block diagram illustrating a configuration example of a mobile terminal according to a fifth embodiment.

FIG. 25 illustrates a configuration example of the mobile terminal 130. The mobile terminal 130 includes a manual page display process unit 131, an option information request transmission unit 132, an option information reception unit 133, a warning message display process unit 134, a display unit 135, and a communication unit 136.

The manual page display process unit 131 performs the same operation as the manual page display process unit 65 (FIG. 9) according to the second embodiment. Further, the manual page display process unit 131 also has a function of confirming, based on a selector included in a manual page MP currently displayed by the display unit 135, whether or not optional hardware is necessary, and, in a case where optional hardware is necessary, supplying an optional hardware identifier IDHW corresponding to the optional hardware to the option information request transmission unit 132. In this case, when the manual page MP includes selectors related to multiple pieces of optional hardware, the manual page display process unit 131 generates multiple optional hardware identifiers IDHW corresponding to the multiple pieces of optional hardware.

Based on the optional hardware identifier IDHW supplied from the manual page display process unit 131, the option information request transmission unit 132 transmits a transmission request of option information INFHW indicating whether or not the optional hardware corresponding to the optional hardware identifier IDHW is installed to the image processing apparatus 150 via the communication unit 136.

The option information reception unit 133 receives, via the communication unit 136, the option information INFHW transmitted from the image processing apparatus 150 in response to the transmission request of the option information INFHW transmitted by the option information request transmission unit 132. Then, the option information reception unit 133 supplies the option information INFHW to the warning message display process unit 134.

Based on the option information INFHW supplied from the option information reception unit 133, the warning message display process unit 134 instructs the display unit 135 to display a warning message. Specifically, based on the option information INFHW supplied from the option information reception unit 133, the warning message display process unit 134 confirms whether or not optional hardware necessary for executing the function described in the manual page MP displayed by the display unit 135 is installed in the image processing apparatus 150. Then, when necessary optional hardware is not installed, the warning message display process unit 134 instructs the display unit 135 to display a warning message warning that the function cannot be executed because the optional hardware is not installed.

The display unit 135 displays the manual page MP based on the page data of the manual page MP supplied from the manual page display process unit 131. Further, the display unit 135 also has a function of displaying a warning message based on an instruction from the warning message display process unit 134.

The communication unit 136 communicates with the image processing apparatus 150 and the server 140.

(Server 140)

As illustrated in FIG. 10, the server 140 includes an operation manual storage unit 143. The operation manual storage unit 143 stores the operation manual MAN3 of the image processing apparatus 150. As described above, the operation manual MAN3 includes a manual page MP describing a function that cannot be executed unless some optional hardware is installed. In such a manual page MP, a selector corresponding to the optional hardware is described.

(Image Processing Apparatus 150)

Figure 26:
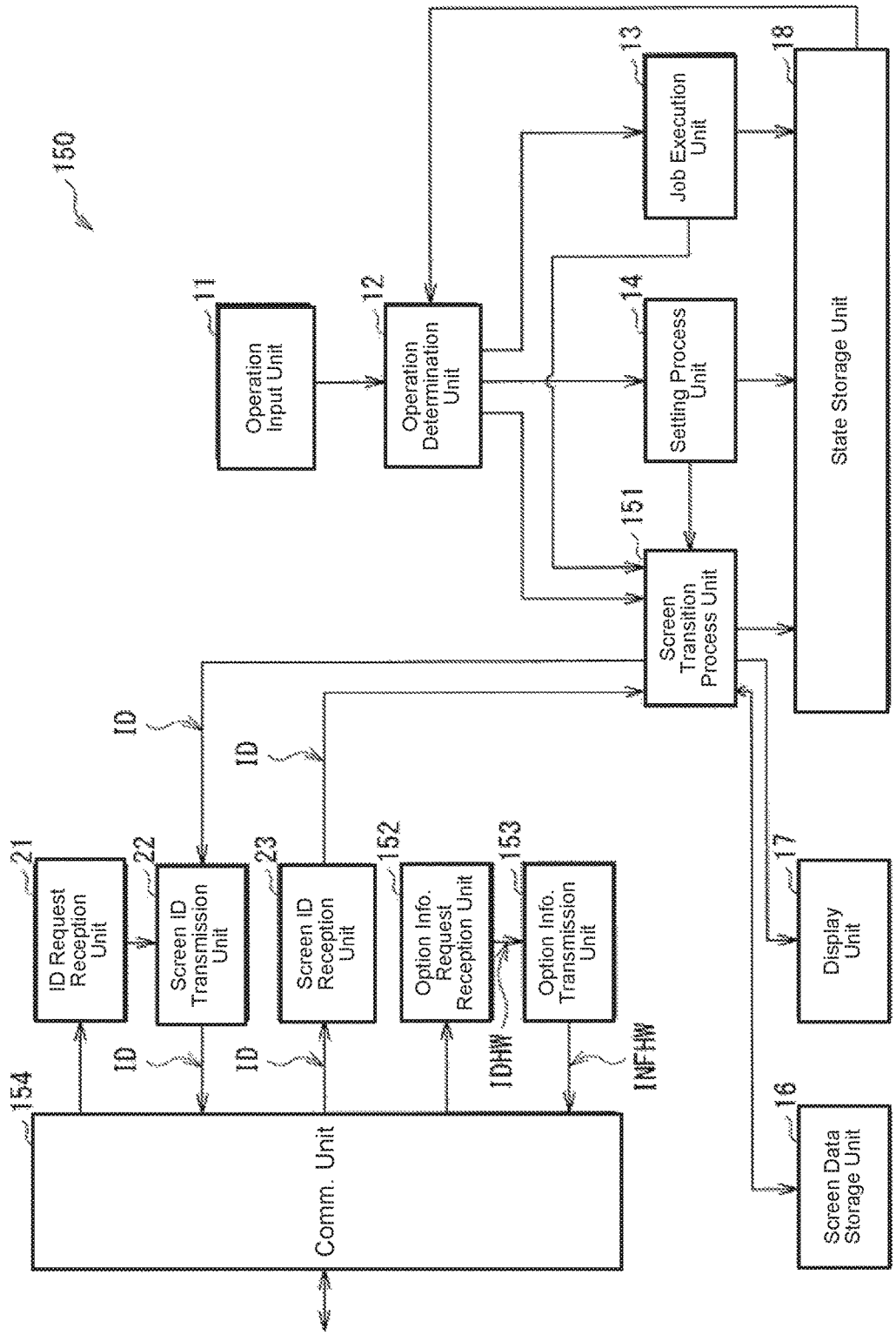
FIG. 26 is a block diagram illustrating a configuration example of an image processing apparatus according to the fifth embodiment.

FIG. 26 illustrates a configuration example of the image processing apparatus 150. The image processing apparatus 150 includes a screen transition process unit 151, an option information request reception unit 152, an option information transmission unit 153, and a communication unit 154.

The screen transition process unit 151 performs the same operation as the screen transition process unit 15 according to the second embodiment. Further, in a case where a screen identifier ID is supplied from the screen identifier reception unit 23, when a function according to an operation screen SO corresponding to the screen identifier ID cannot be executed because some necessary optional hardware is not installed in the image processing apparatus 150, the screen transition process unit 151 also has a function of displaying a part related to the function in gray and making the part not user operable or not displaying the operation screen SO.

The option information request reception unit 152 receives the transmission request of the option information INFHW transmitted from the mobile terminal 130. Then, the option information request reception unit 152 supplies the optional hardware identifier IDHW included in the transmission request of the option information INFHW to the option information transmission unit 153.

The option information transmission unit 153 transmits the option information INFHW indicating whether or not the optional hardware is installed to the mobile terminal 130 via the communication unit 154. Specifically, based on the optional hardware identifier IDHW supplied from the option information request reception unit 152, the option information transmission unit 153 generates option information INFHW indicating whether or not the optional hardware corresponding to the optional hardware identifier IDHW is installed in the image processing apparatus 150, and transmits the generated option information INFHW to the mobile terminal 130. In this case, when multiple optional hardware identifiers IDHW are supplied from the option information request reception unit 152, the option information transmission unit 153 generates option information INFHW indicating whether or not multiple pieces of optional hardware respectively corresponding to the multiple optional hardware identifiers IDHW are installed in the image processing apparatus 150.

The communication unit 154 communicates with the mobile terminal 130.

Here, the screen identifier transmission unit 43, the screen identifier reception unit 46, the option information request transmission unit 132, the option information reception unit 133 and the communication unit 136 correspond to a specific example of a "first communication unit" in the present invention.

(Case C1)

Figure 27:
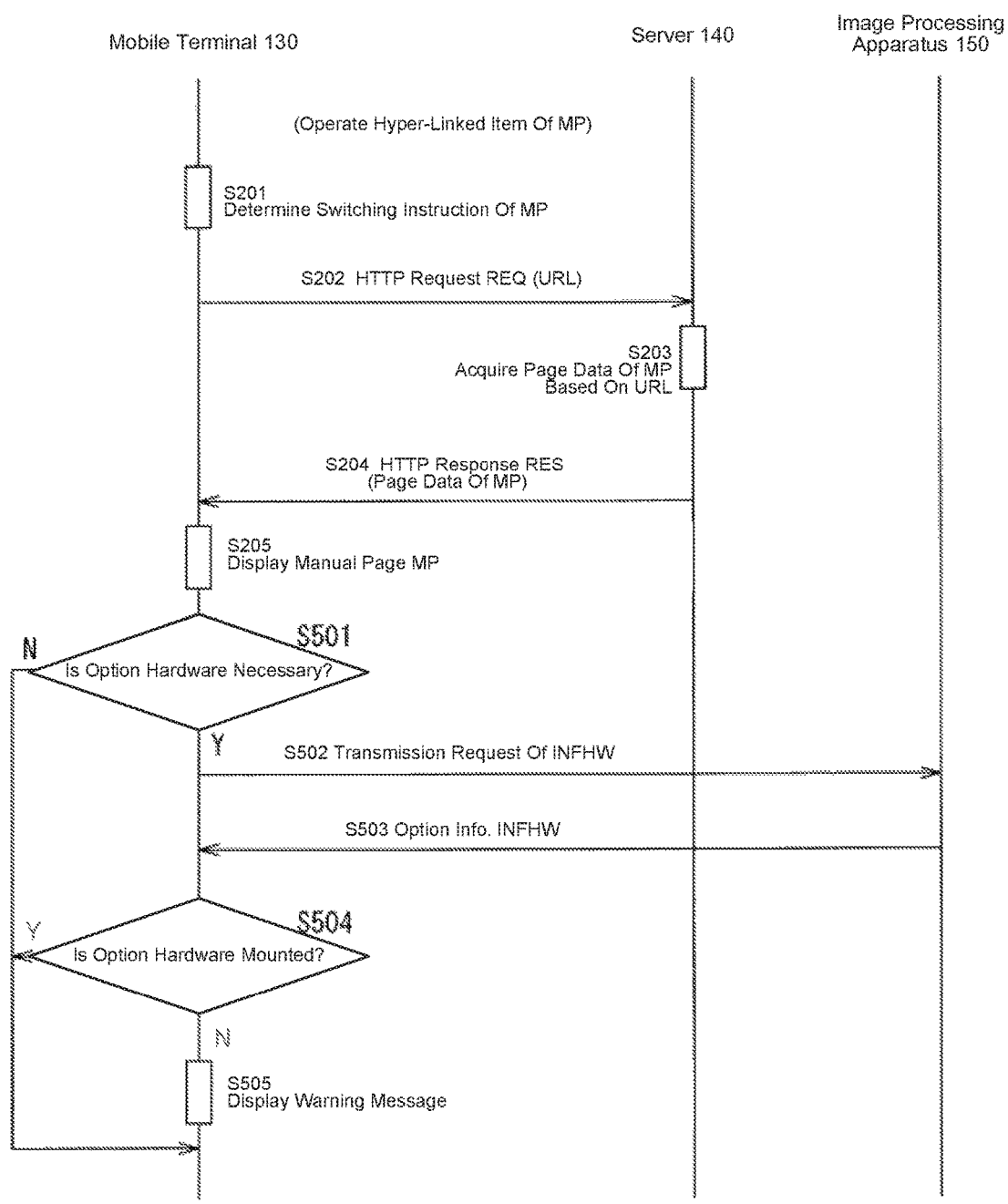
FIG. 27 is a sequence diagram illustrating an operation example of the information processing system according to the fifth embodiment.

FIG. 27 illustrates an operation example of the information processing system 5 in the case where the user operates a hyperlinked item on the manual page MP. This operation is the same as that of the information processing system 2 (FIG. 11) according to the second embodiment until step S205 in which the mobile terminal 130 displays the manual page MP.

Next, the manual page display process unit 131 confirms whether or not optional hardware is necessary based on the selector included in the manual page MP currently displayed by the display unit 135 (step S501). When optional hardware is unnecessary ("N" in step S501), this sequence is terminated. Further, when optional hardware is necessary ("Y" in step S501), the manual page display process unit 131 supplies the optional hardware identifier IDHW corresponding to the optional hardware to the option information request transmission unit 132.

Next, based on the optional hardware identifier IDHW supplied from the manual page display process unit 131, the option information request transmission unit 132 of the mobile terminal 130 transmits to the image processing apparatus 150 a transmission request of option information INFHW indicating whether or not the optional hardware corresponding to the optional hardware identifier IDHW is installed (step S502). The option information request reception unit 152 of the image processing apparatus 150 receives the transmission request of the option information INFHW and supplies the optional hardware identifier IDHW included in the option information INFHW to the option information transmission unit 153.

Next, based on the optional hardware identifier IDHW supplied from the option information request reception unit 152, the option information transmission unit 153 of the image processing apparatus 150 generates option information INFHW indicating whether or not the optional hardware corresponding to the optional hardware identifier IDHW is installed in the image processing apparatus 150, and transmits the generated option information INFHW to the mobile terminal 130 (step S503). The option information reception unit 133 of the mobile terminal 130 receives the option information INFHW and supplies the option information INFHW to the warning message display process unit 134.

Next, based on the option information INFHW supplied from the option information reception unit 133, the warning message display process unit 134 of the mobile terminal 130 confirms whether or not the optional hardware necessary for executing the function described in the manual page MP displayed by the display unit 135 is installed (step S504). When the necessary optional hardware is installed ("Y" in step S504), this sequence is terminated.

Then, in step S504, when the necessary optional hardware is not installed ("N" in step S504), the warning message display process unit 134 and the display unit 135 display a warning message warning that the function cannot be executed because the optional hardware is not installed (step S505).

As a result, this sequence is terminated.

(Case C2)

In the case where the user selects "Sync. Switch Of Operation Screen" of the menu MN, the information processing system 5 performs the same operation as the information processing system 2 according to the second embodiment.

(Case C3)

Figure 28:
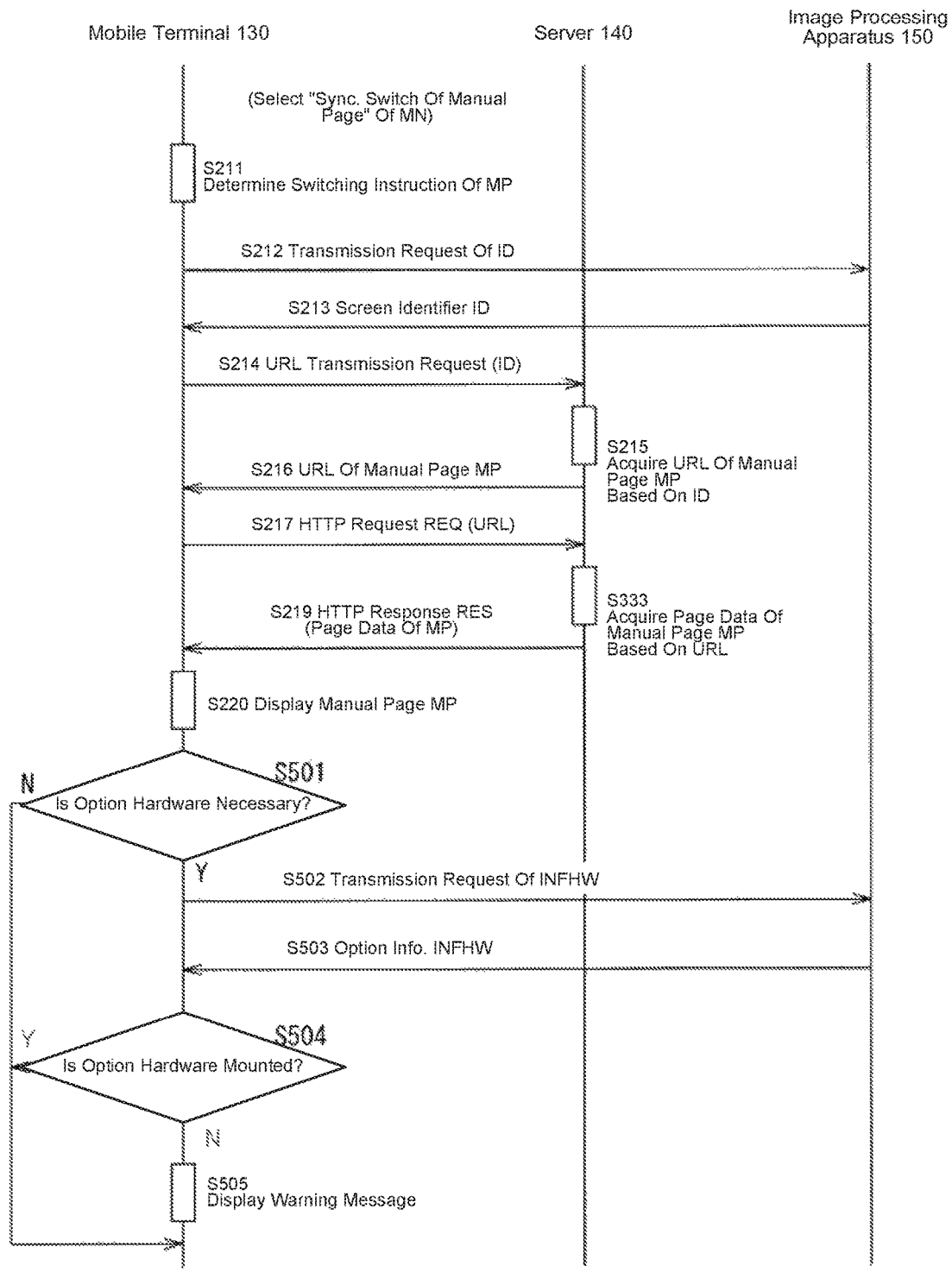
FIG. 28 is a sequence diagram illustrating another operation example of the information processing system according to the fifth embodiment.

FIG. 28 illustrates an operation example of the information processing system 5 in the case where the user selects the "Sync. Switch Of Manual Page" of the menu MN. This operation is the same as that of the information processing system 2 (FIG. 12) according to the second embodiment until step S220 in which the mobile terminal 130 displays the manual page MP. Further, the operation of steps S501-S505 is the same as the operation of the information processing system 5 in the case C1 (FIG. 27).

In this way, in information processing system 5, when optional hardware is not installed, the mobile terminal 130 displays a warning message. Therefore, the user can know that the function according to the manual page MP being viewed cannot be executed. Therefore, user convenience can be improved.

In the present embodiment, when optional hardware is not installed, the mobile terminal displays a warning message. Therefore, user convenience can be improved.

6. Sixth Embodiment

Next, an information processing system 6 according to a sixth embodiment is described. In the present embodiment, a synchronous operation is performed based on a bookmark. A configuration component that is substantially the same as in the information processing system 2 according to the above second embodiment is indicated using the reference numeral symbol, and description thereof is omitted as appropriate. As illustrated in FIG. 8, the information processing system 6 includes an image processing apparatus 10, the access point 9, a mobile terminal 160, and the server 50.

The mobile terminal 160 is configured to be able to perform bookmark registration by associating a screen identifier ID with a URL of a manual page MP. As a result, in the information processing system 6, a synchronous operation of the operation screen SO displayed on the image processing apparatus 10 and the manual page MP displayed on the mobile terminal 160 can be customized.

Specifically, in the information processing system 6, for example, in the case where the operation screen SO displayed on the image processing apparatus 10 is synchronized with the manual page MP displayed by the mobile terminal 160, when the URL of the manual page MP is registered as a bookmark, the operation screen SO corresponding to the screen identifier ID registered in association with the URL is displayed. Further, in the information processing system 6, when the URL is not registered as a bookmark, an operation screen SO corresponding to the screen identifier ID described in the HTML header of the manual page MP is displayed.

Further, in the information processing system 6, for example, in the case where the manual page MP displayed on the mobile terminal 160 is synchronized with the operation screen SO displayed by the image processing apparatus 10, when the screen identifier ID corresponding to the operation screen SO is registered as a bookmark, the manual page MP corresponding to the URL registered in association with the screen identifier ID is displayed. Further, in the information processing system 6, when the screen identifier ID is not registered as a bookmark, the manual page MP in which the screen identifier ID is described in the HTML header is displayed.

(Mobile Terminal 160)

Figure 29:
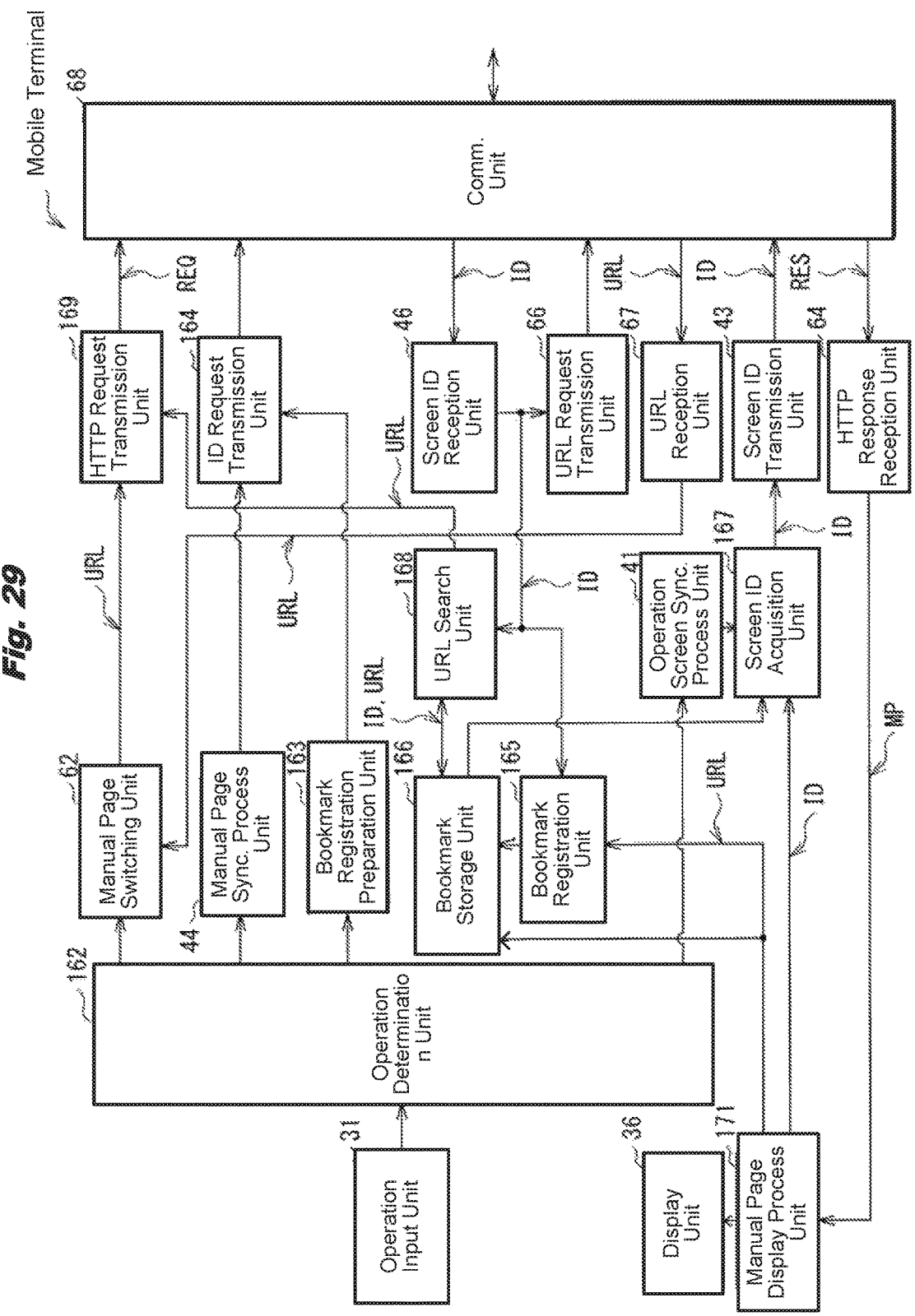
FIG. 29 is a block diagram illustrating a configuration example of a mobile terminal according to a sixth embodiment.

FIG. 29 illustrates a configuration example of the mobile terminal 160. The mobile terminal 160 includes an operation determination unit 162, a bookmark registration preparation unit 163, an identifier request transmission unit 164, a bookmark registration unit 165, a bookmark storage unit 166, a screen identifier acquisition unit 167, URL search unit 168, a HTTP request transmission unit 169, and a manual page display process unit 171.

The operation determination unit 162 performs the same operation as the operation determination unit 32 according to the second embodiment. Further, the operation determination unit 162 also has a function of issuing an instruction to the bookmark registration preparation unit 163, for example, when a user performs an operation to perform bookmark registration.

Based on an instruction from the operation determination unit 162, the bookmark registration preparation unit 163 instructs the identifier request transmission unit 164 to transmit a transmission request of a screen identifier ID to the image processing apparatus 10.

Based on an instruction from the manual page synchronization process unit 44, the identifier request transmission unit 164 transmits a transmission request of a screen identifier ID to the image processing apparatus 10 via the communication unit 68. Further, the identifier request transmission unit 164 also has a function of transmitting a transmission request of a screen identifier ID to the image processing apparatus 10 via the communication unit 68 based on an instruction from the bookmark registration preparation unit 163.

The bookmark registration unit 165 performs bookmark registration based a URL of a manual page MP currently displayed by the display unit 36 supplied from the manual page display process unit 171 and a screen identifier ID corresponding to an operation screen SO currently displayed by the image processing apparatus 10 supplied from the screen identifier reception unit 46.

The bookmark storage unit 166 stores bookmarks registered by the bookmark registration unit 165 in a bookmark table TBL.

Figures 30, 31:
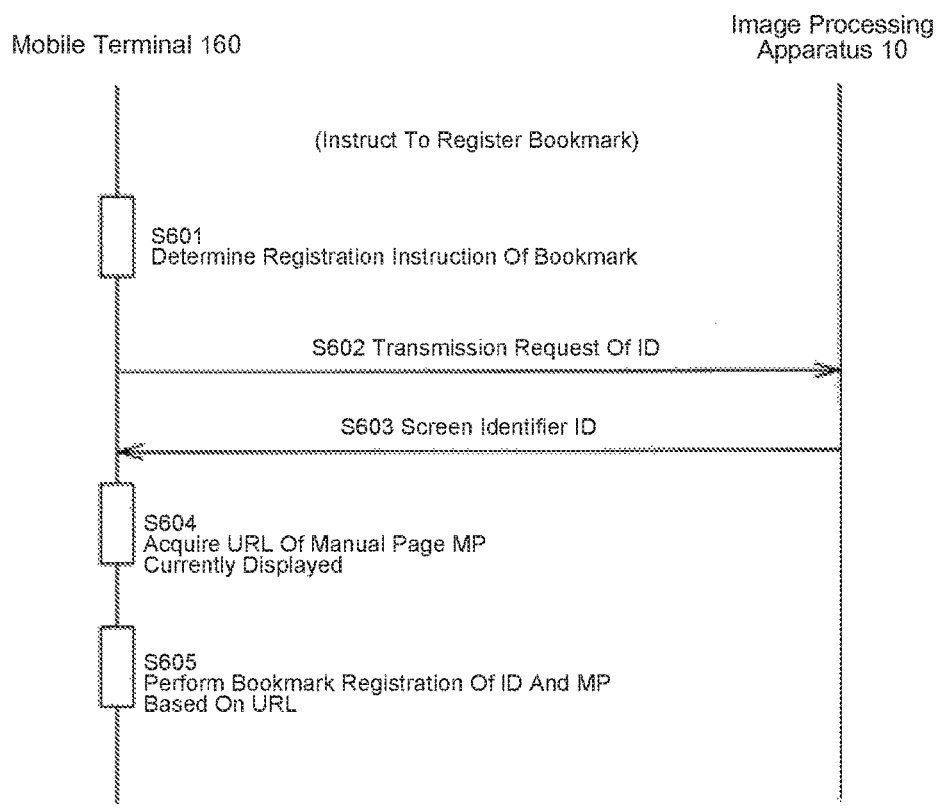
FIG. 30 is a table illustrating a configuration example of a bookmark table.
FIG. 31 is a sequence diagram illustrating an operation example of an information processing system according to the sixth embodiment.

FIG. 30 illustrates an example of bookmark table TBL. In this way, in the bookmark table TBL, a screen identifier ID and a URL of a manual page MP are registered in association with each other.

Further, when a URL of a manual page MP currently displayed by the display unit 36 supplied from the manual page display process unit 171 is registered as a bookmark, the bookmark storage unit 166 supplies a screen identifier ID registered in association with the URL to the screen identifier acquisition unit 167. Further, when a screen identifier ID supplied from the URL search unit 168 is registered as a bookmark, the bookmark storage unit 166 also has a function of supplying, based on an instruction from the URL search unit 168, a URL of a manual page MP registered in association with the screen identifier ID to the URL search unit 168.

Based on an instruction from the operation screen synchronization process unit 41, the screen identifier acquisition unit 167 acquires a screen identifier ID from the manual page display process unit 171 and supplies the screen identifier ID to the screen identifier transmission unit 43. Further, when a screen identifier ID is supplied from the bookmark storage unit 166, the screen identifier acquisition unit 167 also has a function of supplying the screen identifier ID to the screen identifier transmission unit 43.

When a screen identifier ID corresponding to an operation screen SO currently displayed by the image processing apparatus 10 is supplied from the screen identifier reception unit 46, the URL search unit 168 supplies the screen identifier ID to the bookmark storage unit 166. Then, when a URL of a manual page MP is supplied from the bookmark storage unit 166, the URL search unit 168 supplies the URL to the HTTP request transmission unit 169.

Based on a URL supplied from the manual page switching unit 62, the HTTP request transmission unit 169 generates a HTTP request REQ including the URL and transmits the generated HTTP request REQ to the server 50 via the communication unit 68. Further, when a URL of a manual page MP is supplied from the URL search unit 168, the HTTP request transmission unit 169 also has a function of generating an HTTP request REQ including the URL and transmitting the generated HTTP request REQ to the server 50 via the communication unit 68.

The manual page display process unit 171 performs the same operation as the manual page display process unit 65 according to the second embodiment. Further, the manual page display process unit 171 also has a function of supplying a URL of a manual page MP currently displayed by the display unit 36 to the bookmark registration unit 165 and the bookmark storage unit 166.

Here, the screen identifier transmission unit 43, the screen identifier reception unit 46 and the communication unit 68 correspond to a specific example of a "first communication unit" in the present invention. The bookmark registration unit 165 and the bookmark storage unit 166 correspond to a specific example of a "registration unit" in the present invention.

(Bookmark Registration Operation)

FIG. 31 illustrates an operation example of the information processing system 6 when a bookmark is registered. In the case where the display unit 36 of the mobile terminal 160 displays a manual page MP and the display unit 17 of the image processing apparatus 10 displays an operation screen SO, when a user operates the mobile terminal 160 to perform an operation to perform bookmark registration, the operation determination unit 162 of the mobile terminal 160 determines that the user operation is an instruction to perform bookmark registration (step S601). Then, the operation determination unit 162 issues an instruction to the bookmark registration preparation unit 163.

Next, based on an instruction from the bookmark registration preparation unit 163, the identifier request transmission unit 164 transmits a transmission request of a screen identifier ID to the image processing apparatus 10 (step S602). Then, the identifier request reception unit 21 of the image processing apparatus 10 receives the transmission request of the screen identifier ID transmitted from the mobile terminal 160.

Next, based on an instruction from the identifier request reception unit 21, the screen identifier transmission unit 22 of the image processing apparatus 10 transmits a screen identifier ID supplied from the screen transition process unit 15 to the mobile terminal 160 (step S603). The screen identifier reception unit 46 of the mobile terminal 160 receives the screen identifier ID transmitted from the image processing apparatus 10 and supplies the screen identifier ID to the bookmark registration unit 165.

Next, the bookmark registration unit 165 acquires a URL of a manual page MP currently displayed by the display unit 36 from the manual page display process unit 171 (step S604).

Then, the bookmark registration unit 165 performs bookmark registration by associating the screen identifier ID with the URL of the manual page MP (step S605). The bookmark storage unit 166 stores the registered bookmark in the bookmark table TBL.

As a result, this sequence is terminated.

(Case C1)

In the case where the user operates a hyperlinked item on the manual page MP, the information processing system 6 performs the same operation as the information processing system 2 (FIG. 11) according to the second embodiment.

(Case C2)

Figure 32:
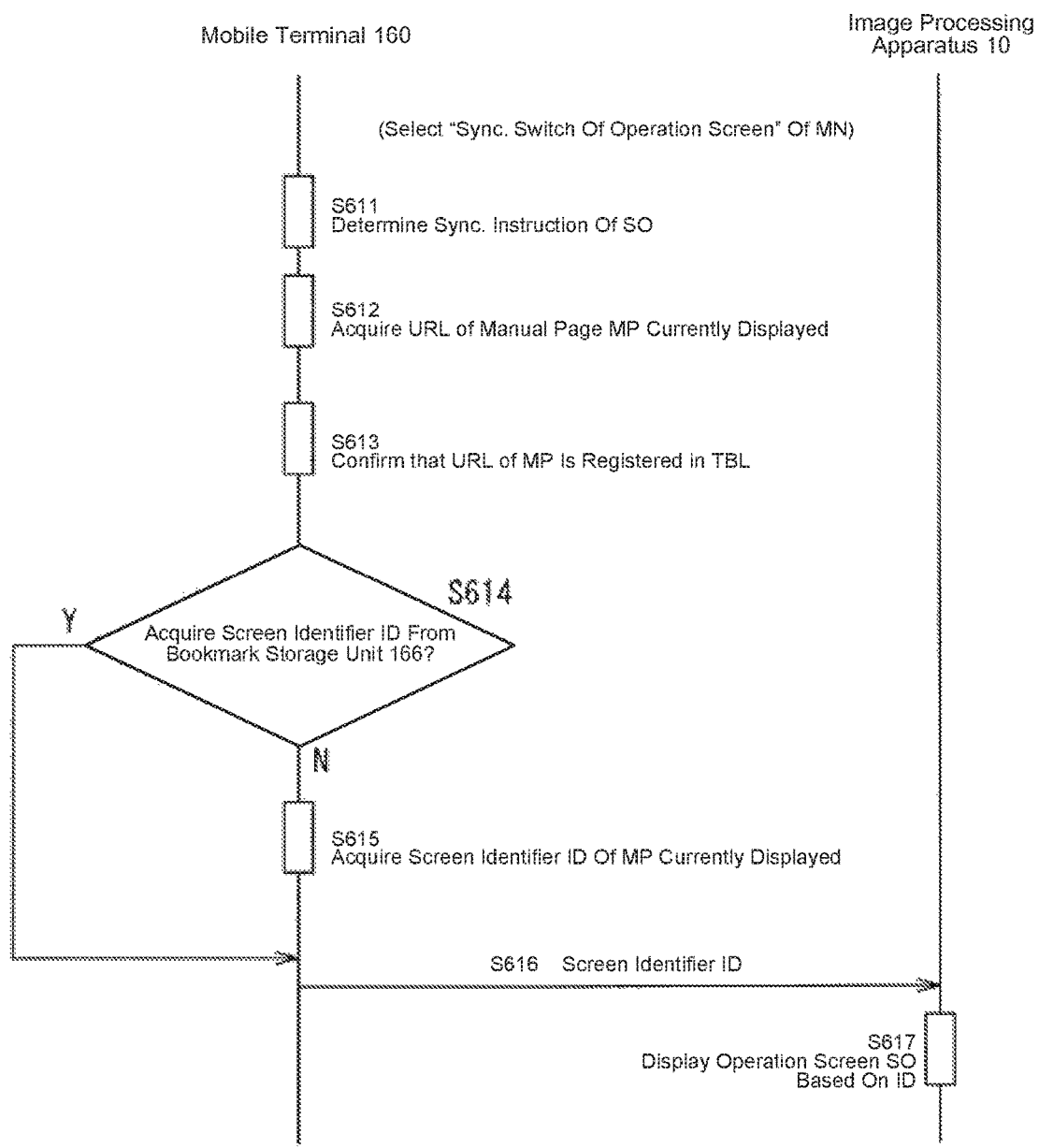
FIG. 32 is a sequence diagram illustrating another operation example of the information processing system according to the sixth embodiment.

FIG. 32 illustrates an operation example of the information processing system 6 in the case where the user selects the "Sync. Switch Of Operation Screen" of the menu MN. In a case where the display unit 36 of the mobile terminal 160 displays a manual page MP, when the user selects the "Sync. Switch Of Operation Screen" of the menu MN, the operation determination unit 162 of the mobile terminal 160 determines that the user operation is an instruction to synchronize the operation screen SO with the manual page MP (step S611). Then, the operation determination unit 162 issues an instruction to the operation screen synchronization process unit 41.

Next, the bookmark storage unit 166 acquires the URL of the manual page MP currently displayed by the display unit 36 from the manual page display process unit 171 (step S612).

Next, the bookmark storage unit 166 confirms whether or not the acquired URL of the manual page MP is registered in the bookmark table TBL (step S613). Then, when the acquired URL of the manual page MP is registered in the bookmark table TBL, the bookmark storage unit 166 supplies the screen identifier ID registered in association with the manual page MP to the screen identifier acquisition unit 167.

When the screen identifier ID is acquired from the bookmark storage unit 166 ("Y" in step S614), the screen identifier acquisition unit 167 supplies the screen identifier ID to the screen identifier transmission unit 43, and the process proceeds to step S616.

Further, when the screen identifier ID cannot be acquired from the bookmark storage unit 166 ("N" in step S614), the screen identifier acquisition unit 167 acquires the screen identifier ID of the manual page MP currently displayed by the display unit 36 supplied from the manual page display process unit 171 (step S615). Then, the screen identifier acquisition unit 167 supplies the screen identifier ID to the screen identifier transmission unit 43.

Next, the screen identifier transmission unit 43 transmits the screen identifier ID to the image processing apparatus 10 (step S616). Then, the screen identifier reception unit 23 of the image processing apparatus 10 receives the screen identifier ID transmitted from the mobile terminal 160 and supplies the screen identifier ID to the screen transition process unit 15.

Then, the screen transition process unit 15 and the display unit 17 of the image processing apparatus 10 display an operation screen SO based on the screen identifier ID (step S617).

As a result, this sequence is terminated.

(Case C3)

Figure 33:
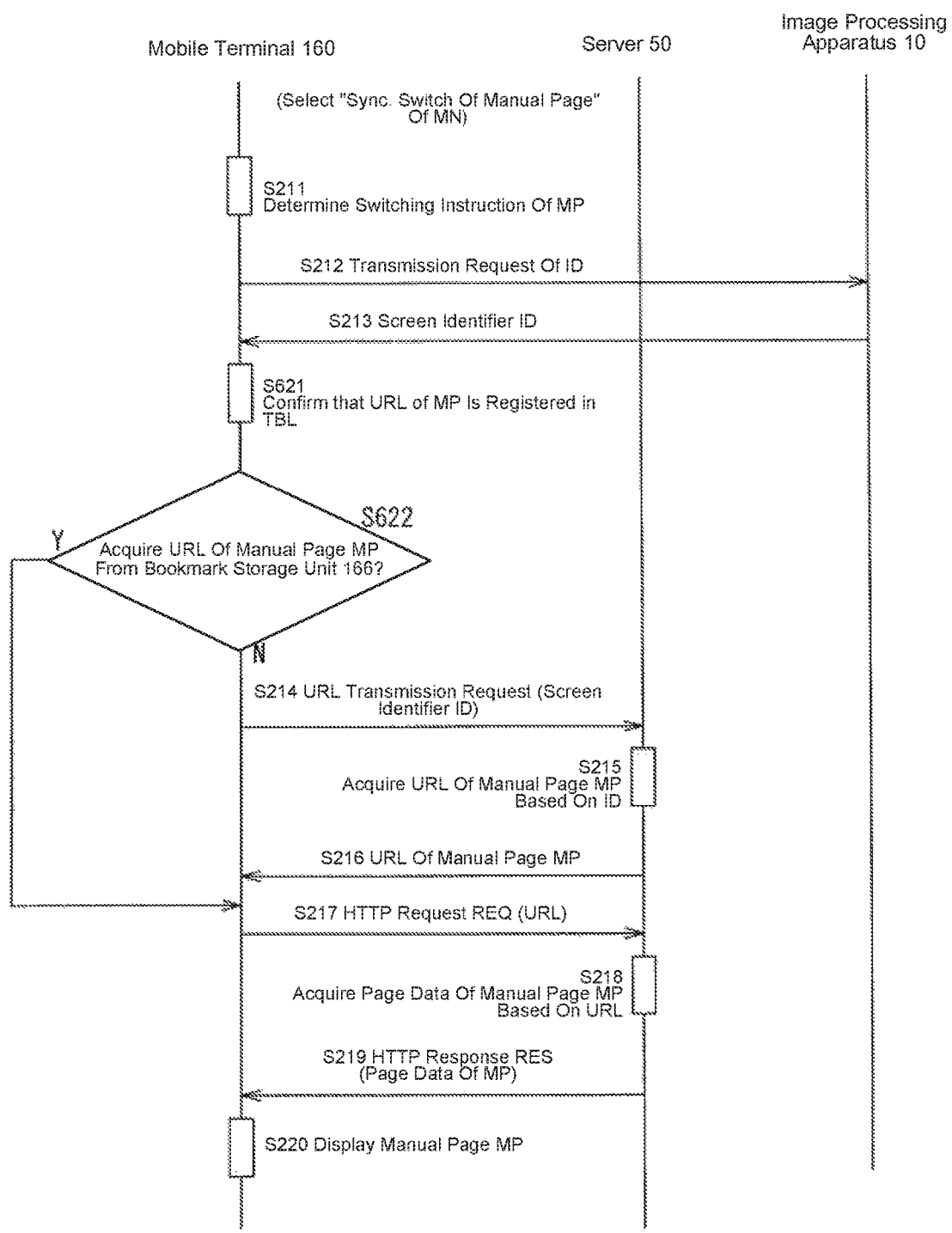
FIG. 33 is a sequence diagram illustrating another operation example of the information processing system according to the sixth embodiment.

FIG. 33 illustrates an operation example of the information processing system 6 in the case where the user selects the "Sync. Switch Of Manual Page" of the menu MN. An operation until the mobile terminal 160 receives a screen identifier ID (steps S211-S213), and an operation from when the mobile terminal 160 transmits a URL transmission request including the screen identifier ID until a manual page MP is displayed (step S214-S220), are the same as those in the information processing system 2 (FIG. 12) according to the second embodiment. In step S213, the screen identifier reception unit 46 of the mobile terminal 160 receives the screen identifier ID and supplies the screen identifier ID to the URL search unit 168.

Next, the URL search unit 168 confirms whether or not the screen identifier ID supplied from the screen identifier reception unit 46 is registered in the bookmark table TBL (step S621). When the screen identifier ID supplied from the URL search unit 168 is registered as a bookmark, the bookmark storage unit 166 supplies, based on an instruction from the URL search unit 168, a URL of a manual page MP registered in association with the screen identifier ID to the URL search unit 168.

When the URL of the manual page MP is acquired from the bookmark storage unit 166 ("Y" in step S622), the URL search unit 168 supplies the URL to the HTTP request transmission unit 169, and the process proceeds to step S217.

When the URL of the manual page MP cannot be acquired from the bookmark storage unit 166 ("N" in step S622), the URL search unit 168 notifies the URL request transmission unit 66 to that effect, and the process proceeds to step S214. As a result, the URL request transmission unit 66 of the mobile terminal 160 transmits a URL transmission request including the screen identifier ID to the server 50 based on the screen identifier ID (step S214), and the manual page specifying unit 54 of the server 50 acquires the URL of the manual page MP based on the screen identifier ID included in the URL transmission request (step S215) and transmits the URL to the mobile terminal 160 (step S216). The URL reception unit 67 of the mobile terminal 160 receives the URL and supplies this URL to the manual page switching unit 62. Then, the manual page switching unit 62 supplies the URL to the HTTP request transmission unit 169.

Next, based on the URL (step S216) supplied from the manual page switching unit 62 or the URL supplied from the URL search unit 168 ("Y" in step S622), the HTTP request transmission unit 169 of the mobile terminal 160 transmits an HTTP request REQ including the URL to the server 50 (step S217); and based on the URL included in the HTTP request REQ, the manual page acquisition unit 52 of the server 50 acquires a manual page MP corresponding to the URL from the operation manual storage unit 53 (step S218), and transmits an HTTP response RES including the page data of the acquired manual page MP to the mobile terminal 160 (Step S219). Then, based on the page data of the manual page MP included in the HTTP response RES, the manual page display process unit 171 and the display unit 36 of the mobile terminal 160 display the manual page MP (step S220).

As a result, this flow is terminated.

In this way, in the information processing system 6, bookmark registration can be performed by associating a screen identifier ID with a URL of a manual page MP. Therefore, a synchronous operation of an operation screen SO and a manual page MP can be customized. Therefore, user convenience can be improved.

In the present embodiment, since bookmark registration can be performed, user convenience can be improved.

In the above, the present technology has been described by illustrating a few embodiments. However, the present technology is not limited to these embodiments and the like, and various modifications are possible.

For example, in the above third-sixth embodiments, the operation manual of the image processing apparatus is stored in the server. However, without being limited to this, similar to the first embodiment, the operation manual may also be installed on the mobile terminal.

Further, for example, two or more of the techniques of the above third-sixth embodiments may be combined.

Further, for example, in the above embodiments, a menu including two items ("Sync. Switch Of Operation Screen" and "Sync. Switch Of Manual Page") is displayed on the mobile terminal, and the user operates the mobile terminal to instruct a synchronous operation. Instead of this, for example, it is also possible that the menu is displayed on the image processing apparatus, and the user operates the image processing apparatus to instruct an synchronous operation. Further, these menu items may be displayed in both the mobile terminal and the image processing apparatus.

Further, for example, in the above embodiments, the present technology is applied to a so-called multifunction peripheral device having a copy function, a facsimile function, a scan function, a print function, and the like. However, the present invention is not limited this. Instead of this, the present invention may also be applied to a multifunction peripheral device that does not have some of these functions, or, for example, the present invention may also be applied to a device having a single function among these functions (for example, a printer).

Further, for example, in the above embodiments, the present technology is applied to an image processing apparatus. However, the present invention is not limited to this. Instead of this, the present invention can be applied to various electronic apparatuses displaying an operation screen.

What is claimed is:

1. An information processing system comprising:
    a terminal apparatus connected to a network, the terminal apparatus being configured to perform a print process; and
    an information processing apparatus connected to the terminal apparatus through the network, the information processing apparatus comprising:
        a display unit that displays first explanatory information of the terminal apparatus;
        an input unit that receives a user operation input by a user;
        a processor that is configured to function as a first acquisition unit that, when the display unit displays the first explanatory information, based on a first instruction from the input unit, acquires a first identifier corresponding to the first explanatory information displayed by the display unit, the first instruction being one type of the user operation;
        a first communication unit that transmits the first identifier acquired by the first acquisition unit to the terminal apparatus; and
        a storage unit that stores
            multiple explanatory informations including the first explanatory information, and
            operation explanatory information that includes correspondence information identifying correspondence between multiple identifiers including the first identifier and the multiple explanatory informations, wherein
    the first acquisition unit uses the correspondence information to acquire the first identifier corresponding to the first explanatory information from the storage unit,
    the terminal apparatus displays an operation screen that corresponds to the first identifier transmitted from the first communication unit of the information processing apparatus and receives operation information in the displayed operation screen, and
    the terminal apparatus performs the print process based on the operation information entered in the operation screen.

2. The information processing system according to claim 1, wherein
    the first explanatory information is also associated with information about an optional device to be installed in the terminal apparatus in order to execute a function described by the first explanatory information,
    the first communication unit inquires of the terminal apparatus whether or not the optional device corresponding to the first explanatory information displayed by the display unit is installed, and
    the display unit displays a warning message when the optional device is not installed in the terminal apparatus based on a result of the inquiry by the first communication unit.

3. The information processing system according to claim 2, wherein
    the correspondence information further includes correspondence information between the first explanatory information and the optional device, and
    the first communication unit uses the correspondence information to inquire of the terminal apparatus whether or not the optional device corresponding to the first explanatory information is installed.

4. The information processing system according to claim 1, wherein
    the first explanatory information is also associated with a language identifier indicating a language used in the first explanatory information, and
    the first communication unit transmits to the terminal apparatus the language identifier corresponding to the first explanatory information displayed by the display unit in addition to the first identifier.

5. The information processing system according to claim 1, wherein,
    after transmitting the first identifier to the terminal apparatus, the first communication unit receives from the terminal apparatus a notification indicating that authentication processing is necessary, and,
    based on the notification indicating that authentication processing is necessary, the display unit displays an authentication screen for inputting authentication information.

6. The information processing system according to claim 5, wherein
the input unit issues a second instruction based on the authentication information input on the authentication screen, and,
based on the second instruction, the first communication unit transmits the authentication information input on the authentication screen to the terminal apparatus.

7. The information processing system according to claim 1, wherein
the processor is further configured to function as a registration unit,
when the display unit displays second explanatory information of the terminal apparatus, based on a third instruction from the input unit, the first communication unit receives a second identifier by requesting the terminal apparatus to transmit the second identifier, and
the registration unit registers the second explanatory information and the second identifier received by the first communication unit in association with each other.

8. The information processing system according to claim 7, wherein,
when the display unit displays the second explanatory information, based on the first instruction from the input unit, the first acquisition unit acquires the second identifier registered in association with the second explanatory information displayed by the display unit, and
the first communication unit transmits the second identifier acquired by the first acquisition unit to the terminal apparatus.

9. The information processing system according to claim 8, wherein,
in the correspondence information, the second explanatory information is associated with an identifier other than the second identifier.

10. The information processing system according to claim 1, wherein
the multiple explanatory informations are associated with the multiple identifiers and are also associated with multiple operation screens that are to be displayed by the terminal apparatus,
the multiple operation screens respectively display functions of the terminal apparatus and accept user operations, and
each of the multiple explanatory informations is information regarding an operation method of a corresponding operation screen among the multiple operation screens.

11. An information processing system comprising:
a terminal apparatus connected to a network, the terminal apparatus being configured to perform a print process;
a server connected to the network; and
an information processing apparatus connected to the terminal apparatus and the server through the network, the information processing apparatus comprising:
a display unit that displays first explanatory information of the terminal apparatus;
an input unit that receives a user operation input by a user;
a processor that is configured to function as a first acquisition unit that, when the display unit displays the first explanatory information, based on a first instruction from the input unit, acquires a first identifier corresponding to the first explanatory information displayed by the display unit, the first instruction being one type of the user operation;
a first communication unit that transmits the first identifier acquired by the first acquisition unit to the terminal apparatus; and
a second communication unit that communicates with the server through the network, the server storing operation explanatory information that includes multiple explanatory informations including the first explanatory information and operation explanatory information that includes correspondence information identifying correspondence between multiple identifiers including the first identifier and the multiple explanatory informations, wherein
the first acquisition unit uses the correspondence information to acquire the first identifier corresponding to the first explanatory information from the server,
the terminal apparatus displays an operation screen that corresponds to the first identifier transmitted from the first communication unit of the information processing apparatus and receives operation information in the displayed operation screen, and
the terminal apparatus performs the print process based on the operation information entered in the operation screen.

12. An information processing system comprising:
a terminal apparatus connected to a network, the terminal apparatus being configured to perform a print process; and
an information processing apparatus connected to the terminal apparatus through the network, the information processing apparatus comprising:
a display unit that displays first explanatory information of the terminal apparatus;
an input unit that receives a user operation input by a user;
a processor that is configured to function as a first acquisition unit and a second acquisition unit, the first acquisition acquiring, when the display unit displays the first explanatory information, based on a first instruction from the input unit, a first identifier corresponding to the first explanatory information displayed by the display unit, the first instruction being one type of the user operation; and
a first communication unit that transmits the first identifier acquired by the first acquisition unit to the terminal apparatus,
wherein,
based on a fourth instruction from the input unit, the first communication unit receives a third identifier from the terminal apparatus by requesting the terminal apparatus to transmit the third identifier,
the second acquisition unit acquires third explanatory information of the terminal apparatus corresponding to the third identifier received by the first communication unit,
the display unit displays the third explanatory information acquired by the second acquisition unit,
the terminal apparatus displays an operation screen that corresponds to the first identifier transmitted from the first communication unit of the information processing apparatus and receives operation information in the displayed operation screen,
terminal apparatus transmits the third identifier to the first communication unit of the information processing apparatus based on the fourth instruction, and
the terminal apparatus performs the print process based on the operation information entered in the operation screen.

13. The information processing system according to claim 12 further comprising:
- a storage unit that stores operation explanatory information that includes multiple explanatory informations including the third explanatory information and includes correspondence information regarding correspondence between multiple identifiers including the third identifier and the multiple explanatory informations, wherein
- the second acquisition unit uses the correspondence information to acquire the third explanatory information corresponding to the third identifier from the storage unit.

14. The information processing system according to claim 12 further comprising:
- a second communication unit that communicates with a server through the network, the server storing operation explanatory information that includes multiple explanatory informations including the third explanatory information and operation explanatory information that includes correspondence information identifying correspondence between multiple identifiers including the third identifier and the multiple explanatory informations, wherein
- the second acquisition unit uses the correspondence information to acquire the third explanatory information corresponding to the third identifier from the server.

15. An information processing method performed by an information processing apparatus that communicates with an terminal apparatus through a network, the method comprising:
- causing a display unit of the information processing apparatus to display first explanatory information of the terminal apparatus;
- causing an input unit of the information processing apparatus to receive a user operation input by a user;
- causing the information processing apparatus to acquire a first identifier corresponding to the first explanatory information displayed by the display unit and to transmit the first identifier to the terminal apparatus, based on a first instruction from the input unit, the first instruction being one type of the user operation;
- causing the terminal apparatus to receive the first identifier and to display a first operation screen corresponding to the first identifier;
- causing the terminal apparatus to display a second operation screen;
- causing the information processing apparatus to request the terminal apparatus to transmit a second identifier of the second operation screen, based on a second instruction from the input unit, the second instruction being another type of the user operation;
- causing the terminal apparatus to transmit the second identifier to the information processing apparatus;
- causing the information processing apparatus to receive the second identifier and to acquire second explanatory information corresponding to the second identifier;
- causing the display unit to display the second explanatory information;
- causing the terminal apparatus to receive operation information in at least one of the first operation screen and the second operation screen from the user, and
- causing the terminal apparatus to perform the print process based on the operation information.

* * * * *